United States Patent
Kobayashi

(10) Patent No.: US 7,079,698 B2
(45) Date of Patent: Jul. 18, 2006

(54) IMAGE CODING AND DECODING APPARATUS, METHOD OF IMAGE CODING AND DECODING, AND RECORDING MEDIUM FOR RECORDING PROGRAM FOR IMAGE CODING AND DECODING

(75) Inventor: Yoshikazu Kobayashi, Hiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/654,838

(22) Filed: Sep. 4, 2003

(65) Prior Publication Data

US 2004/0042675 A1 Mar. 4, 2004

Related U.S. Application Data

(62) Division of application No. 10/041,228, filed on Jan. 7, 2002, now Pat. No. 6,643,408, which is a division of application No. 09/052,468, filed on Mar. 31, 1998, now Pat. No. 6,351,570.

(30) Foreign Application Priority Data

| Apr. 1, 1997 | (JP) | ................................................ 9-81775 |
| Apr. 3, 1997 | (JP) | ................................................ 9-85144 |

(51) Int. Cl.
*G06K 9/36* (2006.01)
*G06K 9/46* (2006.01)

(52) U.S. Cl. ......................... 382/250; 382/233; 382/246

(58) Field of Classification Search ......... 382/232–233, 382/244–248, 250–251, 238–240; 341/65, 341/67, 50, 95, 59; 375/240.03, 240.18–240.25; 358/426.01–426.16; 708/401
See application file for complete search history.

(56) References Cited

U.S. PATENT DOCUMENTS

| 5,216,516 A | 6/1993 | Tanaka et al. .............. 382/248 |
| 5,550,542 A | 8/1996 | Inoue .......................... 341/67 |
| 5,689,254 A | 11/1997 | Fujiwara et al. .............. 341/59 |
| 5,825,312 A | * 10/1998 | D'Ortenzio ................... 341/65 |
| 5,838,825 A | 11/1998 | Obayashi et al. ............ 382/233 |
| 5,883,975 A | * 3/1999 | Narita et al. ................ 382/232 |
| 6,092,920 A | 7/2000 | Sakamoto .................... 708/401 |
| 6,351,570 B1 | 2/2002 | Kobayashi .................. 382/250 |
| 6,396,955 B1 | * 5/2002 | Abe ........................... 382/232 |

FOREIGN PATENT DOCUMENTS

| JP | 06-044039 | 2/1994 |
| JP | 8139609 | 7/1996 |

* cited by examiner

*Primary Examiner*—Amelia M. Au
*Assistant Examiner*—Ishrat Sherali

(57) ABSTRACT

In an image decoding apparatus that generates a decoded image from a code sequence. The decoding apparatus has a bus, a computer and a memory, wherein the computer and the memory are connected to each other via the bus. The code sequence is generated by performing orthogonal transform, quantization and entropy coding on image data, which is stored in the memory. The decoding apparatus includes an entropy decoding unit, achieved by the computer, for reading one code out of the code sequence, which is stored in the memory, via the bus and performing entropy decoding on the read code in to generate a decode value. The apparatus also includes a coefficient generating unit, achieved by the computer, for generating at least one orthogonal transform coefficient according to the generated decode value. Also, a writing unit is achieved by the computer, for writing the generated at least one orthogonal transform coefficient into the memory via the bus. A decode controlling unit and the writing unit is provided for instructing the entropy decoding unit to process a next code out of the code sequence.

10 Claims, 36 Drawing Sheets

Fig. 8

| i | Zig(i) |
|---|---|
| 0 | 0 |
| 1 | 1 |
| 2 | 8 |
| 3 | 16 |
| 4 | 9 |
| 5 | 2 |
| 6 | 3 |
| 7 | 10 |
| 8 | 17 |
| ... | ... |
| 63 | 63 |

Fig. 15

| 123 | -4  | 96   | -60 | -11 | 15  | -12 | 2  |
|-----|-----|------|-----|-----|-----|-----|----|
| 3   | -30 | -100 | -7  | 0   | -23 | 3   | 7  |
| 4   | -3  | 117  | 1   | 0   | -1  | 0   | 9  |
| 64  | 37  | 10   | -1  | -7  | -1  | 9   | 11 |
| -18 | -8  | 0    | 0   | -3  | 0   | 0   | 0  |
| -4  | 11  | 8    | 30  | -4  | -1  | -19 | -3 |
| 10  | 11  | -1   | 2   | 0   | -1  | 8   | -3 |
| 21  | 0   | 4    | 2   | -1  | 0   | 10  | 1  |

Fig. 16

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

Fig. 19

| 8  | 0  | 10 | -4 | 0 | 0 | 0 | 0 |
|----|----|----|----|---|---|---|---|
| 0  | -3 | -7 | 0  | 0 | 0 | 0 | 0 |
| 0  | 0  | 7  | 0  | 0 | 0 | 0 | 0 |
| 5  | 2  | 0  | 0  | 0 | 0 | 0 | 0 |
| -1 | 0  | 0  | 0  | 0 | 0 | 0 | 0 |
| 0  | 0  | 0  | 0  | 0 | 0 | 0 | 0 |
| 0  | 0  | 0  | 0  | 0 | 0 | 0 | 0 |
| 0  | 0  | 0  | 0  | 0 | 0 | 0 | 0 |

Fig. 20

| 128 | 0   | 100 | -64 | 0 | 0 | 0 | 0 |
|-----|-----|-----|-----|---|---|---|---|
| 0   | -36 | -98 | 0   | 0 | 0 | 0 | 0 |
| 0   | 0   | 112 | 0   | 0 | 0 | 0 | 0 |
| 70  | 34  | 0   | 0   | 0 | 0 | 0 | 0 |
| -18 | 0   | 0   | 0   | 0 | 0 | 0 | 0 |
| 0   | 0   | 0   | 0   | 0 | 0 | 0 | 0 |
| 0   | 0   | 0   | 0   | 0 | 0 | 0 | 0 |
| 0   | 0   | 0   | 0   | 0 | 0 | 0 | 0 |

Fig. 21

2050　2052 RUN　2051　2053 DIFFERENT SIGN BIT
　　　　　　　　　　2054 EVALUATION BIT PATTERN

| RUN LENGTH | VARIABLE LENGTH CODE |
|---|---|
| 6 | 0 0 0 0  0 0 1 1  0 0 0<br>0 0 0 0  0 0 1 1  0 0 1<br>0 0 0 0  0 0 1 1  0 1 0<br>0 0 0 0  0 0 1 1  0 1 1<br>0 0 0 0  0 0 1 1  1 0 0<br>0 0 0 0  0 0 1 1  1 0 1<br>0 0 0 0  0 0 1 1  1 1 0<br>0 0 0 0  0 0 1 1  1 1 1    2057 / 2055 |
| 5 | 0 0 0 0  0 1 0 0  0 0 0<br>0 0 0 0  0 1 0 0  0 0 1<br>0 0 0 0  0 1 0 0  0 1 0<br>0 0 0 0  0 1 0 0  0 1 1<br>0 0 0 0  0 1 0 0  1 0<br>0 0 0 0  0 1 0 0  1 1<br>0 0 0 0  0 1 0 1  0 0<br>0 0 0 0  0 1 0 1  0 1<br>0 0 0 0  0 1 0 1  1 0<br>0 0 0 0  0 1 0 1  1 1<br>0 0 0 0  0 1 1 0<br>0 0 0 0  0 1 1 1 |
| 4 | 0 0 0 0  1 0 0 0<br>0 0 0 0  1 0 0 1<br>0 0 0 0  1 0 1 0<br>0 0 0 0  1 0 1 1   — 2088<br>0 0 0 0  1 1 0   — 2089a<br>0 0 0 0  1 1 1   — 2089b |
| 3 | 0 0 0 1  0<br>0 0 0 1  1 |
| 2 | 0 0 1 0<br>0 0 1 1 |
| 1 | 0 1 0<br>0 1 1 |
| 0 | 1 |

Fig. 28

| ADDRESS | DECODE VALUE | CODE LENGTH |
|---|---|---|
| 0 | 1 | 1 |
| 1 | 3 | 3 |
| 2 | 2 | 3 |
| 3 | 5 | 4 |
| 4 | 4 | 4 |
| 5 | 7 | 5 |
| 6 | 6 | 5 |
| 7 | 13 | 8 |
| 8 | 12 | 8 |
| 9 | 11 | 8 |
| 10 | 10 | 8 |
| 11 | 9 | 7 |
| 12 | 9 | 7 |
| 13 | 8 | 7 |
| 14 | 8 | 7 |
| 15 | 25 | 11 |
| 16 | 24 | 11 |
| 17 | 23 | 11 |
| 18 | 22 | 11 |
| 19 | 21 | 10 |
| 20 | 21 | 10 |
| 21 | 20 | 10 |
| 22 | 20 | 10 |
| 23 | 19 | 10 |
| 24 | 19 | 10 |
| 25 | 18 | 10 |
| 26 | 18 | 10 |
| 27 | 17 | 10 |

8 BIT    4 BIT

| ADDRESS | DECODE VALUE | CODE LENGTH |
|---|---|---|
| 28 | 17 | 10 |
| 29 | 16 | 10 |
| 30 | 16 | 10 |
| 31 | 15 | 8 |
| 32 | 15 | 8 |
| 33 | 15 | 8 |
| 34 | 15 | 8 |
| 35 | 15 | 8 |
| 36 | 15 | 8 |
| 37 | 15 | 8 |
| 38 | 15 | 8 |
| 39 | 14 | 8 |
| 40 | 14 | 8 |
| 41 | 14 | 8 |
| 42 | 14 | 8 |
| 43 | 14 | 8 |
| 44 | 14 | 8 |
| 45 | 14 | 8 |
| 46 | 14 | 8 |
| 47 | 33 | 11 |
| 48 | 32 | 11 |
| 49 | 31 | 11 |
| 50 | 30 | 11 |
| 51 | 29 | 11 |
| 52 | 28 | 11 |
| 53 | 27 | 11 |
| 54 | 26 | 11 |

8 BIT    4 BIT

Fig. 35

CODING TABLE 4540

| VALUE TO BE CODED (4541) | BIT PATTERN LENGTH (4542) | BIT PATTERN (IN BINARY NOTATION) (4543) |
|---|---|---|
| 00 | 4 | 1010 |
| 01 | 2 | 00 |
| 02 | 2 | 01 |
| 03 | 3 | 100 |
| 04 | 4 | 1011 |
| 05 | 5 | 11010 |
| 06 | 7 | 1111000 |
| 07 | 8 | 11111000 |
| 08 | 10 | 1111110110 |
| 09 | 16 | 1111111110000010 |
| 0A | 16 | 1111111110000011 |
| 0B | 0 | 0 |
| ⋮ | ⋮ | ⋮ |
| 0F | 0 | 0 |
| 10 | 0 | 0 |
| 11 | 4 | 1100 |
| 12 | 5 | 11011 |
| 13 | 7 | 1111001 |
| ⋮ | ⋮ | ⋮ |
| FF | 0 | 0 |

←—5 BIT—→ ←—16 BIT—→

Fig. 36

CODING TABLE 4530

| VALUE TO BE CODED | RUN LENGTH | BIT PATTERN LENGTH | BIT PATTERN (IN BINARY NOTATION) |
|---|---|---|---|
| 00 | 1 | 2 | 10 |
| 01 | 0 | 1 | 0 |
| 02 | 0 | 1 | 1 |
| 03 | 1 | 1 | 0 |
| 04 | 1 | 2 | 11 |
| 05 | 2 | 2 | 10 |
| 06 | 4 | 2 | 00 |
| 07 | 5 | 2 | 00 |
| 08 | 6 | 3 | 110 |
| 09 | 9 | 6 | 000010 |
| 0A | 9 | 6 | 000011 |
| 0B | 0 | 0 | 0 |
| ⋮ | ⋮ | ⋮ | ⋮ |
| 0F | 0 | 0 | 0 |
| 10 | 0 | 0 | 0 |
| 11 | 2 | 1 | 0 |
| 12 | 2 | 2 | 11 |
| 13 | 4 | 3 | 01 |
| ⋮ | ⋮ | ⋮ | ⋮ |
| FF | 0 | 0 | 0 |

←―4 BIT―→←―4 BIT―→←―8 BIT―→

US 7,079,698 B2

IMAGE CODING AND DECODING APPARATUS, METHOD OF IMAGE CODING AND DECODING, AND RECORDING MEDIUM FOR RECORDING PROGRAM FOR IMAGE CODING AND DECODING

The present application is a divisional application of U.S. patent application Ser. No. 10/041,228 filed on Jan. 7, 2002 now U.S. Pat. No. 6,643,408, which is a divisional application of U.S. patent application Ser. No. 09/052,468 filed on Mar. 31, 1998, now U.S. Pat. No. 6,351,570.

BACKGROUND OF THE INVENTION (1) Field of the Invention

The present invention relates to an apparatus and a method for an orthogonal transform, a quantization, and an entropy coding of images and a medium recording a program for these coding processes, and relates to an apparatus and a method for an inverse transform and the decoding of a compressed code sequence which is obtained after the orthogonal transform, quantization, and entropy coding, and a recoding medium for recording a program for these decoding processes.

(2) Description of the Related Art

In recent years, techniques for decoding images which have been coded and compressed with high efficiency have been extensively developed and used in various fields, such as computers, communications, and broadcasts. Joint Photographic Coding Experts Group (JPEG) is recommended as an international standard for the compression coding and expansion decoding of images and Moving Picture Experts Group 1 (MPEG 1) Video is recommended as an international standard for the decoding of movies.

With these methods, image information is divided into blocks, each of which is composed of a certain number of pixels. Each pixel in the blocks is subjected to the orthogonal transform, quantization, and entropy coding to generate codes (or sometimes referred to as Huffman codes). The generated codes are combined and, construct a compression code sequence (or referred to simply as a code sequence). Codes in the compression code sequence are subjected to the entropy decoding, dequantization, and inverse orthogonal transform to generate an original image.

It should be noted here that, in the following description, the process for subjecting each pixel to the orthogonal transform, quantization, and entropy coding is referred to as a compression coding (or referred to simply as a coding) to be distinguished from the entropy coding. Also, the process for subjecting codes to the entropy decoding, dequantization, and inverse transform is referred to as an expansion decoding (or referred to simply as a decoding) to be distinguished from the entropy decoding.

1. Operation for Compression Coding and Decoding

The following is a description of the operation for the compression coding and the expansion decoding which is base on the baseline method which is essential to an image coding apparatus and an image decoding apparatus supporting Discrete Cosine Transform (DCT) of JPEG. The following description uses an example where each of an image coding apparatus and an image decoding apparatus includes a general-purpose microcomputer.

1.1 Procedure for Compression Coding (1) Outline of Operation Procedure for Compression Coding The following is a description of the operation procedure for the compression coding, with reference to the drawings.

FIG. 1 is a flowchart showing the outline of the operation procedure for the compression coding which is based on the JPEG baseline method.

Initialization for coding control is performed and one or more marker codes prescribed by JPEG are outputted (Step S1901). A rectangular area called a block composed of 8×8 pixels is cut out of an image to be compressed and coded (Step S1902), each element in the cut-out block is subjected to the discrete cosine transform, namely one type of the orthogonal transform, DCT coefficients of 8 lines×8 columns are outputted (Step S1903), the outputted DCT coefficients are divided by their corresponding elements in a quantization table, and 64 quantized DCT coefficients are outputted (Step S1904). The process for dividing each DCT coefficient by its corresponding element in the quantization table is called a quantization. The quantized DCT coefficients are scanned in the order called a zigzag scan and are subjected to the entropy coding, namely one type of the transform coding, to output a compression code sequence in which an image is compressed (Step S1905). Whether this process is repeated for all blocks of the image to be compressed and coded is confirmed (Step S1906). If all blocks of the image have been subjected to this process, the compression coding process is completed; if not, the operation returns to Step S1902 and this process is commenced for the next block.

(2) Operation Procedure for Quantization

The following is a description of the operation procedure in the quantization step shown in FIG. 1 as Step S1904, with reference to the flowchart shown in FIG. 2.

The loop counter "i" for controlling the repetition of the quantization process is initialized to be set to the value "0" (Step S1911). A DCT coefficient S(i) and an element Q(i) in the quantization table, which each correspond to the value of the loop counter "i", are loaded from the memory (Steps S1912 and S1913), S(i) is divided by Q(i), the division result is rounded to be normalized so that a quantized DCT coefficient Sq(i) is obtained (Step S1914), and the quantized DCT coefficient Sq(i) is stored in a memory (Step S1915). The loop counter "i" is incremented by one to quantize the next DCT coefficient (Step S1916), and whether all DCT coefficients in one block have been subjected to this process is confirmed using the value of the loop counter "i" (Step, S1917). If all DCT coefficients in one block have been subjected to this process, this quantization process is completed; if not, the operation returns to Step S1912 and remaining DCT coefficients are subjected to this quantization process.

(3) Operation Procedure for Entropy Coding

The following is a description of the operation procedure in the entropy coding step shown in FIG. 1 as Step S1905, with reference to the flowchart in FIG. 3.

A Sq(0), namely the quantized DCT coefficient of a DC component, is loaded from the memory and the DC component Sq(0) is subjected to the entropy coding (Steps S1921 and S1922). A loop counter "i" for controlling the repetition of the entropy coding process on the quantized DCT coefficients of AC components and a counter "nnnn" for counting each zero coefficient run are initialized to be set to the values "1" and "0," respectively (Step S1923). A scan order "z" corresponding to the loop counter "i" is obtained using a zigzag function "Zig( )" for generating a scan order used to perform a zigzag scan on quantized DCT coefficients (Step S1924). Using the scan order "z," a quantized DCT coefficient Sq(z) of an AC component is loaded from the memory (Step S1925) and whether the value of this loaded quantized DCT coefficient Sq(z) is zero is judged (Step S1926). If the value of the quantized DCT coefficient Sq(z) is zero, the zero coefficient run counter "nnnn" is incremented by one (Step S1931); if not, the value of the zero coefficient run counter "nnnn" and the quantized DCT coefficient Sq(z) are combined and subjected to the entropy coding (Step S1927), and the zero coefficient run counter "nnnn" is initialized to be set to the value "0" (Step S1928). The loop counter "i" is incremented by one (Step S1929) and whether this process has been performed on one block is judged using the value of the loop counter "i" (Step S1930). If this process has been performed on one block, the entropy coding is completed; if not, the operation returns to Step S1924 to continue this entropy coding.

1.2 Procedure for Expansion Decoding

To use compressed and coded images, these images need to be subjected to the expansion decoding. The following is a description of the procedure for the expansion decoding, with reference to the drawings.

(1) Outline of Operation Procedure for Expansion Decoding

FIG. 4 is a flowchart showing the outline of the expansion decoding which is based on the JPEG baseline method.

Initialization for control of expansion decoding is performed and each marker code included in a compression code sequence is analyzed (Step S1941). The compression code sequence is subjected to the entropy decoding, namely one type of the transform coding, and 64 quantized DCT coefficients corresponding to one block are obtained (Step S1942). The obtained quantized DCT coefficients are multiplied by their corresponding elements in a quantization table to obtain DCT coefficients corresponding to one block (Step S1943). The obtained DCT coefficients corresponding to one block are subjected to the inverse discrete cosine transform (Step S1944), an original image in one block is restored, the restored original image in one block is outputted to the memory storing decoded images in respective blocks, and a full-size original image is reconstructed (Step S1945). Whether this process has been performed on all blocks is confirmed (Step S1946). If this process has been performed on all blocks, this expansion decoding process is completed; if not, the process from the entropy coding to the image reconfiguration (Steps S1942 to S1945) is repeated on remaining blocks.

(2) Operation Procedure for Entropy Decoding

The following is a description of the entropy decoding step shown in FIG. 4 as Step S1942, with reference to the flowchart in FIG. 5.

One code in a compression code sequence in which an image is compressed is subjected to the entropy decoding to obtain the quantized DCT coefficient Sq(0) of a DC component (Step S1961), and the DC component Sq(0) is stored in a memory (Step S1962). A loop counter "i" for controlling the entropy decoding on the quantized DCT coefficients of AC components is initialized to be set to the value "1" (Step S1963). The next code in the compression code sequence is subjected to the entropy decoding and the value of a zero run length "nnnn" and the quantized DCT coefficient of an AC component are obtained (Step S1964). An index "Z" which is used for a zigzag scan and corresponds to the loop counter "i" is obtained using a zigzag function Zig(i) (Step S1965) and the loop counter "i" is incremented by one (Step S1966). Whether the zero run length "nnnn" is zero is confirmed (Step S1967). If the zero run length "nnnn" is not zero, a value "0" is set as the quantized DCT coefficient Sq(z) of an AC component (Step S1970), Sq(z) having the value "0" is stored in the memory (Step S1971), the zero run length "nnnn" is decremented by one (Step S1972), and the process flow returns to Step S1965. If the zero run length "nnnn" is zero, the AC component Sq(z) is stored in the memory (Step S1968) and whether one block has been subjected to this process is confirmed using the value of the loop counter "i" (Step S1969). If the value of the loop counter "i" is 64, the process is judged to have been performed on one block and this entropy decoding process is completed; if not, the process is not judged to have been performed on one block, and the operation returns to Step S1964 to continue the entropy decoding.

(3) Operation Procedure for Dequantization

The following description concerns the operation procedure in the dequantization step shown in FIG. 4 as Step S1943, with reference to the flowchart in FIG. 6.

A loop counter "i" for controlling the repetition of the dequantization process is initialized to be set to the value "0" (Step S1951). A quantized DCT coefficient Sq(i) and an element Q(i) in the quantization table, which each correspond to the value of the loop counter "i", are loaded from the memory (Steps S1952 and S1953), the quantized DCT coefficient Sq(i) is subjected to the dequantization using $S(i)=Sq(i) \times Q(i)$ to calculate a DCT coefficient S(i) (Step S1954), and the DCT coefficient S(i) is stored in the memory (Step S1955). The loop counter "i" is incremented by one to perform the dequantization on the next quantized DCT coefficient (Step S1956) and whether one block has been subjected to this process is confirmed using the value of the loop counter "i" (Step S1957). If the value of the loop counter "i" is 64, this process is judged to have been performed on one block and the dequantization process is completed; if not, this process is not judged to have been performed on one block and the process flow returns to Step S1952 to continue this dequantization process.

1.3 Order of Zigzag Scan

FIG. 7 shows the order of a zigzag scan during the process of the entropy coding and entropy decoding. In this figure, 64 circles represent quantized DCT coefficients or DCT coefficients. The white circle represents a DC component and 63 black circles represent AC components (AC1 to AC63). The numbers attached to the lower right of the circles and arrows show the order of the zigzag scan. The zigzag scan is repeated in the order of right, lower left, under, upper right, and then right.

Figure 8:
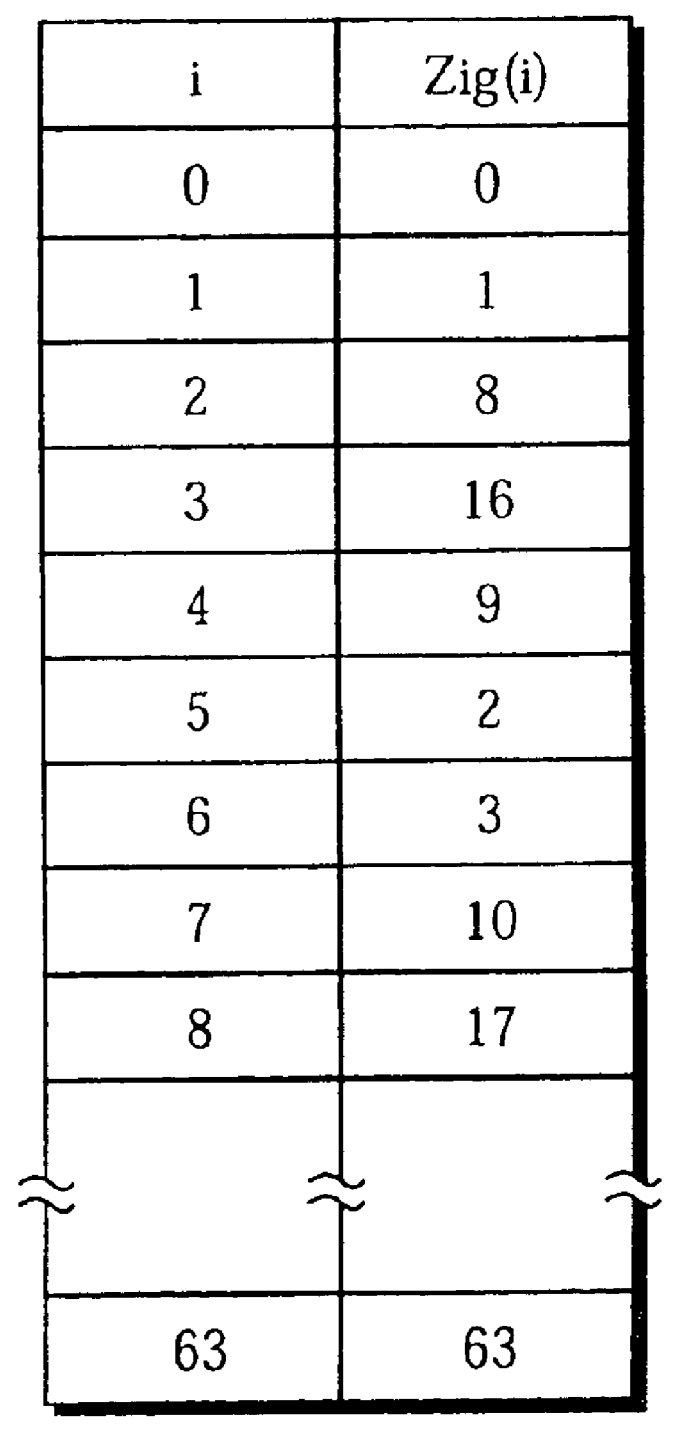

FIG. 8 is a table showing the relation between the element number "i" of a quantized DCT coefficient or a DCT coefficient and the zigzag function Zig(i) which gives an order of the zigzag scan and corresponds to the element number "i".

With the process procedure described above, an image is compressed and coded with efficiency, and a compression code sequence representing a compressed and coded image is expanded and decoded.

2. Entropy Decoding Process

The following is a detailed description of the entropy decoding of a code in Steps S1961 and S1964 in the flowchart of the entropy decoding process shown in FIG. 5.

Each code is made up of a bit sequence including two types of bits "0" and "1" and corresponds to one decode value. The structure of the bit sequence making up a code is determined by the fixed length code method or the variable length code method. With the fixed length code method, all codes have the same code length; with the variable length code method, each code has different code length.

Note that in the following description, codes have variable length, if not otherwise stated.

In the case of the variable length code method, on the assumption that the code length of a code having the longest code length is one word, address spaces each of which is 2 raised to the word length power are prepared in a conventional code sequence entropy decoding apparatus. The conventional code sequence entropy decoding apparatus is provided with a decode table. The decoding table is searched using a bit sequence as long as one word starting from the entropy decoding start position to obtain a corresponding decode value. With this method, the entropy decoding can be performed at high speed. However, as the longest code sequence length becomes longer, the size of the decode table becomes larger. As a result, there is a problem that more memory capacity is required, which increases the cost of the apparatus.

To solve this problem, Japanese Laid-Open Patent Application No. 6-44039 discloses an apparatus where the size of the decode table is reduced. The following description concerns the principle of the entropy decoding, the structure of the decode table, and the procedure for the entropy decoding, which are disclosed in Japanese Laid-Open Patent Application No. 6-44039.

2.1 Principle of Entropy Decoding

The following is a description of the principle of the entropy decoding disclosed in Japanese Laid-Open Patent Application No. 6-44039. As can be seen from FIG. 9, a plurality of variable length codes are divided into groups, where each group includes codes having the same run. Here, the run is a sequence of same bits from the start of each variable length code. With regard to all variable length codes 2087 whose run lengths are "6," each 2-bit sequence following the run is the same bit sequence "11" (this same bit sequence will be hereinafter referred to as an identical bit sequence). As shown in the figure, each variable length code 2087 in the group of the run length "6" has a unique part which follows the run and the identical bit sequence (this unique part will be hereinafter referred to as an evaluation bit pattern) Therefore, this evaluation bit pattern represents its corresponding variable length code in the group of the run length "6." This principle can be applied to other groups of the run lengths which are not "6."

As described above, because a set of a run length, the length of an identical bit, and an evaluation bit pattern represents a certain variable length code, a decoding table can be made using this characteristic.

It should be noted here that the group of the run length "4" in FIG. 9 includes variable length codes of different lengths. The setting manner of the evaluation bit patterns in this group is described later.

2.2 Structure of Decoding Table

The following is a description of the structure of the decoding table which is based on the above-mentioned entropy decoding principle. As shown in FIG. 10, the decoding table is composed of the primary decoding table 2300 and the secondary decoding table 2310.

The primary decoding table 2300 is a two-dimensional data table storing a plurality of sets which are each composed of a shift amount 2302, an evaluation bit pattern length 2303, and an offset 2304. Each run length 2301 is a bit length of a run and is also used as an address specifying one of the plurality of sets in a line of the primary decoding table 2300. Each shift amount 2302 is a run length plus a length of an identical bit sequence. Each evaluation bit pattern length 2303 gives a bit length of an evaluation bit pattern. Each offset 2304 gives a value related to the addressing in the secondary decoding table 2310 described later. Each addition value calculated by adding an offset 2304 to an evaluation bit pattern is an address specifying a decode value in a line of the secondary decoding table 2310.

The secondary decoding table 2310 is a two-dimensional table storing pairs of a decode value 2314 and a code length 2315. Each address 2311 is an addition value obtained by adding an offset 2304 to an evaluation bit pattern and is also used as an address specifying a decode value 2314 in a line of the secondary decoding table 2310. Each decode value 2314 corresponds to a variable length code and is obtained by performing the entropy decoding on the variable length code. Each code length 2315 is a bit length of a variable length code.

In the case of quantized DCT coefficients of AC components of JPEG, each decode value 2314 is made up of two values, that is, a zero run length and a non-zero coefficient value.

2.3 Procedure for Entropy Decoding

The following description concerns the procedure for the entropy decoding of variable length codes using the primary decoding table 2300 and the second decoding table 2310 shown in FIG. 10. The entropy decoding is the transformation of a code extracted from a code sequence into its corresponding decode value. In this description, the variable length code "0000 0011 011" 2086 is extracted from the code sequence of "0000 0011 011 . . . " and is subjected to the entropy decoding.

Because the run length of the variable length code 2086 is "6," the primary decoding table 2300 is searched using this run length "6" as an address to obtain its corresponding values, that is, the shift amount "8" 2302, the evaluation bit pattern "3" 2303, and the offset "A6" 2304. Because the shift amount is "8," the head bit position of the evaluation bit pattern 2085 is detected at the position where the variable length code 2086 is shifted to the left by 8 bits from its head bit. Because the evaluation bit pattern length is "3," the evaluation bit pattern 2085 is determined to be "011." The determined evaluation bit pattern "011" 2085 is added to the offset "A6" to obtain the corresponding address in the secondary decoding table. The secondary decoding table 2310 is searched using the obtained address and the decode value "10" 2314 is obtained.

FIGS. 11 and 28 show respectively the primary decoding table and the secondary decoding table for the decoding apparatus disclosed in Japanese Laid-Open Patent Application No. 6-44039. Because the bit width of the shift amount column is 4 bits, the bit width of the evaluation bit pattern column is 4 bits, the bit width of the offset column is 8 bits, and there are seven types of runs, the size of the primary decoding table is 112 bits calculated from (4 bits+4 bits+8 bits)×7 types. It should be noted here that each run length is an address value in the primary decoding table so that the run length column is not included in the size of this table. Because the bit width of the decode value column is 8 bits, the bit width of the code length column is 4 bits, and there are 55 types of decode values, the size of the secondary decoding table is 660 bits calculated from (8 bits+4 bits)×55 types.

3. Problems in the Conventional Techniques

As described above, an original image is compressed and coded with high efficiency to obtain a compression code sequence, and the compression code sequence is decoded to generate the original image.

However, this image processing for the image compression coding and image decoding needs a very large amount of operations, so that a general-purpose microcomputer will require a long time for this image processing. This is because a large number of memory load and store operations need to be performed due to the very large amount of data of an image, and because many operations which require a long processing time are used in this image processing.

This processing time is conventionally shortened by replacing a general-purpose microcomputer with special hardware or a digital signal processor. However, these devices are high-priced, resulting in the increased cost of products.

SUMMARY OF THE INVENTION

The object of the present invention is to shorten the processing time during the image compression and image decoding, and in particular to improve the image processing time performance of an apparatus which uses a general-purpose microcomputer to process an image.

The object above is achieved by an image coding apparatus which codes image information, the apparatus including: a storage means for storing a plurality of orthogonal transform coefficients corresponding to a block, the block being a part of the image information; a reading means for reading an orthogonal transform coefficient from the storage means, the orthogonal transform coefficient being specified by a coding control means; a quantization means for performing quantization on the orthogonal transform coefficient read by the reading means to generate a first coefficient; an entropy coding means for performing entropy coding according to the generated first coefficient; and the coding control means for, after the read orthogonal transform coefficient is processed by the quantization means and the entropy coding means, specifying a next orthogonal transform coefficient to be read by the reading means.

With this structure, the quantization is also performed in the entropy coding step so that the storing of quantized DCT coefficients, the loop control, and the loading of quantized DCT coefficients can be omitted, which are necessary for a conventional image coding apparatus. As a result, the processing time during the image coding is shortened.

The object above is also achieved by an image decoding apparatus which generates a decoded image from an inputted code sequence, where the code sequence is generated by performing orthogonal transform, quantization, and entropy coding on image data, the apparatus including: an entropy decoding means for reading one code out of the code sequence and performing entropy decoding on the read code to generate a decode value; a coefficient generating means for generating at least one orthogonal transform coefficient according to the generated decode value; a storage means for storing the generated at least one orthogonal transform coefficient; and a decode controlling means for, after processes of the coefficient generating means and the storage means, instructing the entropy decoding means to read a next code out of the code sequence.

With this structure, the entropy decoding and dequantization are successively performed on each code so that the storing of quantized DCT coefficients, the loading of quantized DCT coefficients, and the loop control can be omitted, which are necessary for a conventional image coding apparatus. As a result, the processing time during the image decoding is shortened.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIG. 8 shows the structure of the zigzag function Zig( ) showing the order of the zigzag scan;

FIG. 15 shows an example of DCT coefficients of the digital still camera shown in FIG. 12;

FIG. 16 shows an example of the quantization table used for the digital still camera shown in FIG. 12;

FIG. 19 shows an example of quantized DCT coefficients of the digital still camera shown in FIG. 12;

FIG. 20 shows an example of DCT coefficients obtained by performing the dequantization on the quantized DCT coefficients of the digital still camera shown in FIG. 12;

FIG. 21 shows the principle of the entropy decoding of the digital still camera shown in FIG. 12;

FIG. 28 shows an example of the secondary decoding table of the digital still camera shown in FIG. 12;

FIG. 35 shows an example of the coding table used for a conventional entropy coding process; and FIG. 36 shows an example of the coding table used for the entropy coding process shown in FIG. 33.

DESCRIPTION OF THE PREFERRED EMBODIMENT

1. Embodiment 1

Figure 12:
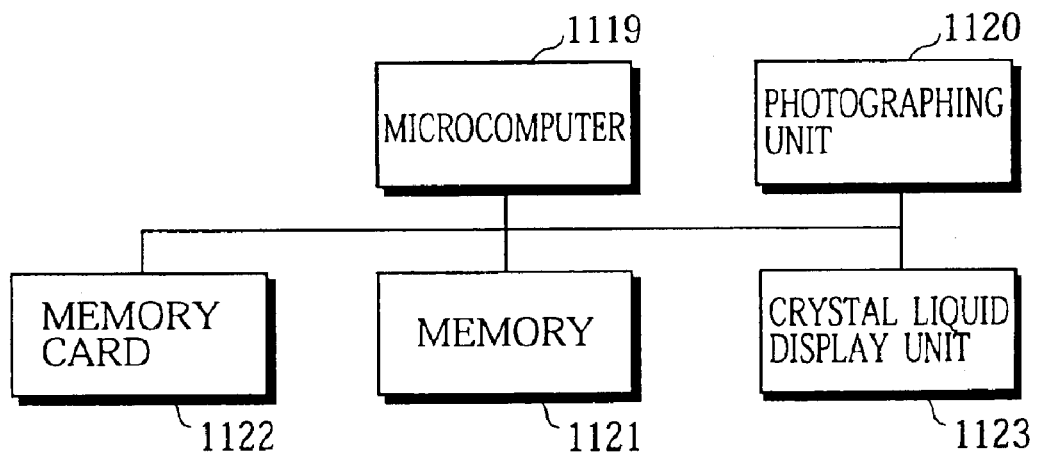
FIG. 12 is the block diagram of a digital still camera of an embodiment of the present invention.

FIG. 12 is a block diagram of the digital still camera of an embodiment of the present invention. The digital still camera in this figure includes: the microcomputer 1119 for controlling the camera and for performing the compression coding and the expansion decoding on images; the image photographing unit 1120 for converting images into electric signals using a CCD; the memory 1121 for temporarily storing information of photographed images to perform the compression coding and the expansion decoding on the images, the memory 1121 including a RAM used for the operation of the microcomputer 1119 and a ROM for storing a control program for controlling the microcomputer 1119; the memory card 1122 for storing data of compressed images (compression code sequence) obtained after the photographed images are subjected to the compression coding; and the liquid crystal display unit 1123 for displaying the photographed images.

1.1 Procedure for Compression Coding of Image

The following is a description of the operation procedure for the compression coding which is based on the JPEG baseline method, and this description mainly concerns differences between this embodiment and the conventional technique.

(1) Outline of Operation Procedure for Compression Coding

Figure 1:
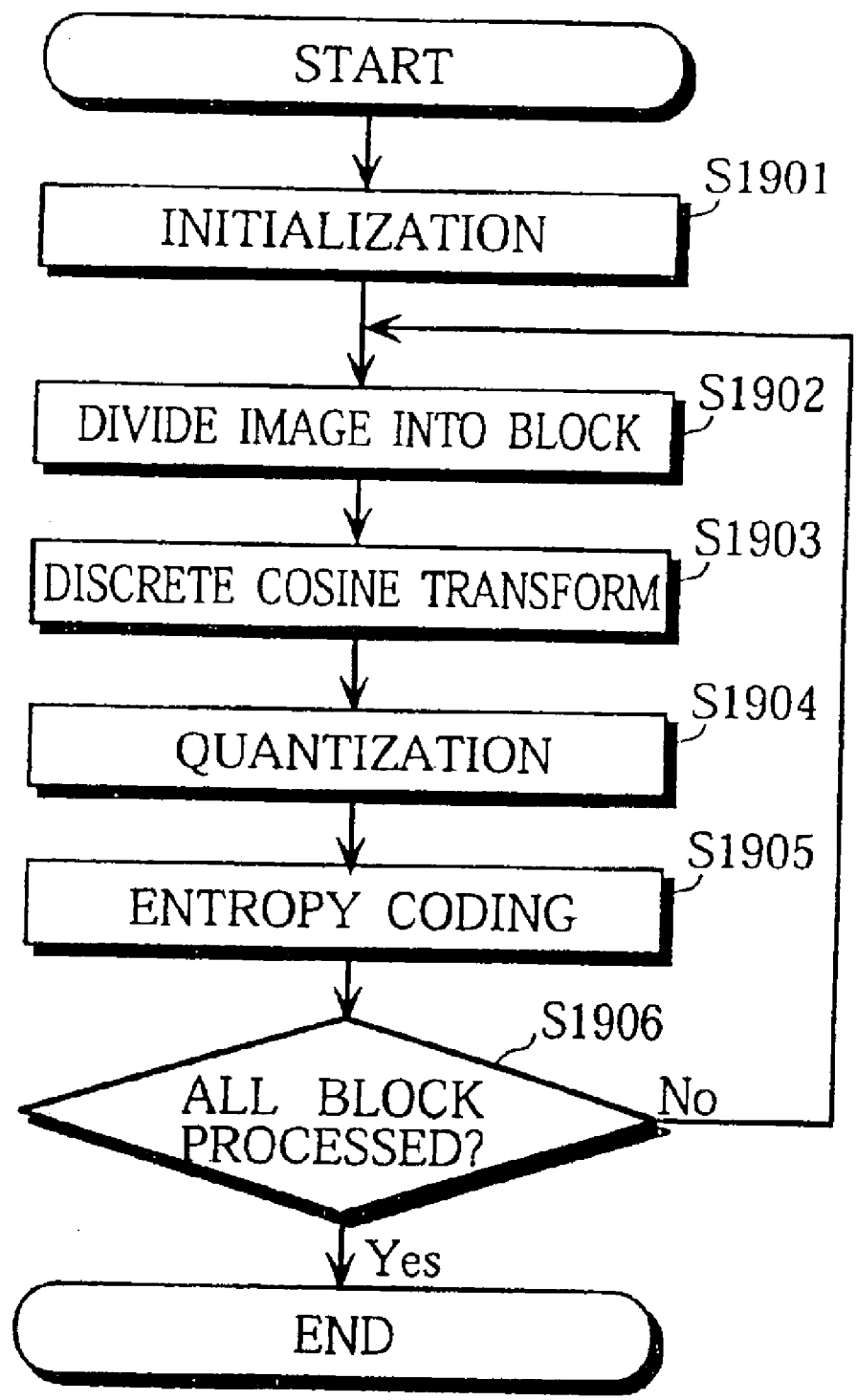
FIG. 1 is a flowchart showing the outline of the coding procedure of a conventional image coding apparatus.
Figure 13:
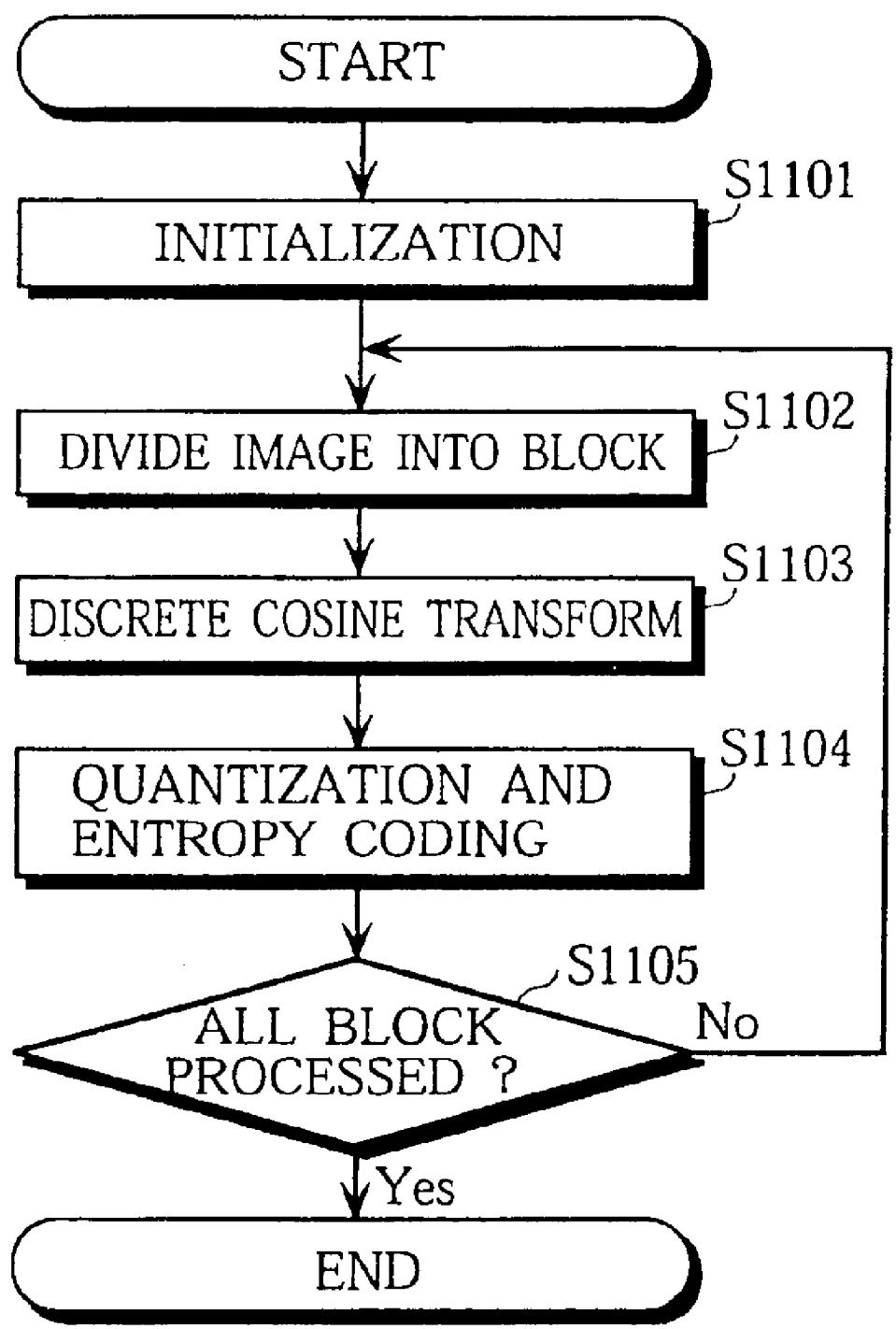
FIG. 13 is a flowchart showing the outline of the compression coding procedure of the digital still camera shown in FIG. 12.

FIG. 13 is a flowchart showing the outline of the operation procedure for the compression coding of the digital still camera shown in FIG. 12. The following description mainly concerns differences between this flowchart and that shown in FIG. 1. Note that the following operation is performed by the microcomputer 1119.

In the digital still camera shown in FIG. 12, DCT coefficients are obtained by subjecting each block to the discrete cosine transform on a block-by-block basis. Each element corresponding to one block is subjected to the quantization and successively to the entropy coding on an element-by-element basis (Step S1104). Other steps, that is, Steps S1101, S1102, S1103, and S1105 are the same as Steps S1901, S1902, S1903, and S1906 shown in FIG. 1, respectively, and therefore are not described here.

(2) Operation Procedure for Quantization and Entropy Coding

Figure 14:
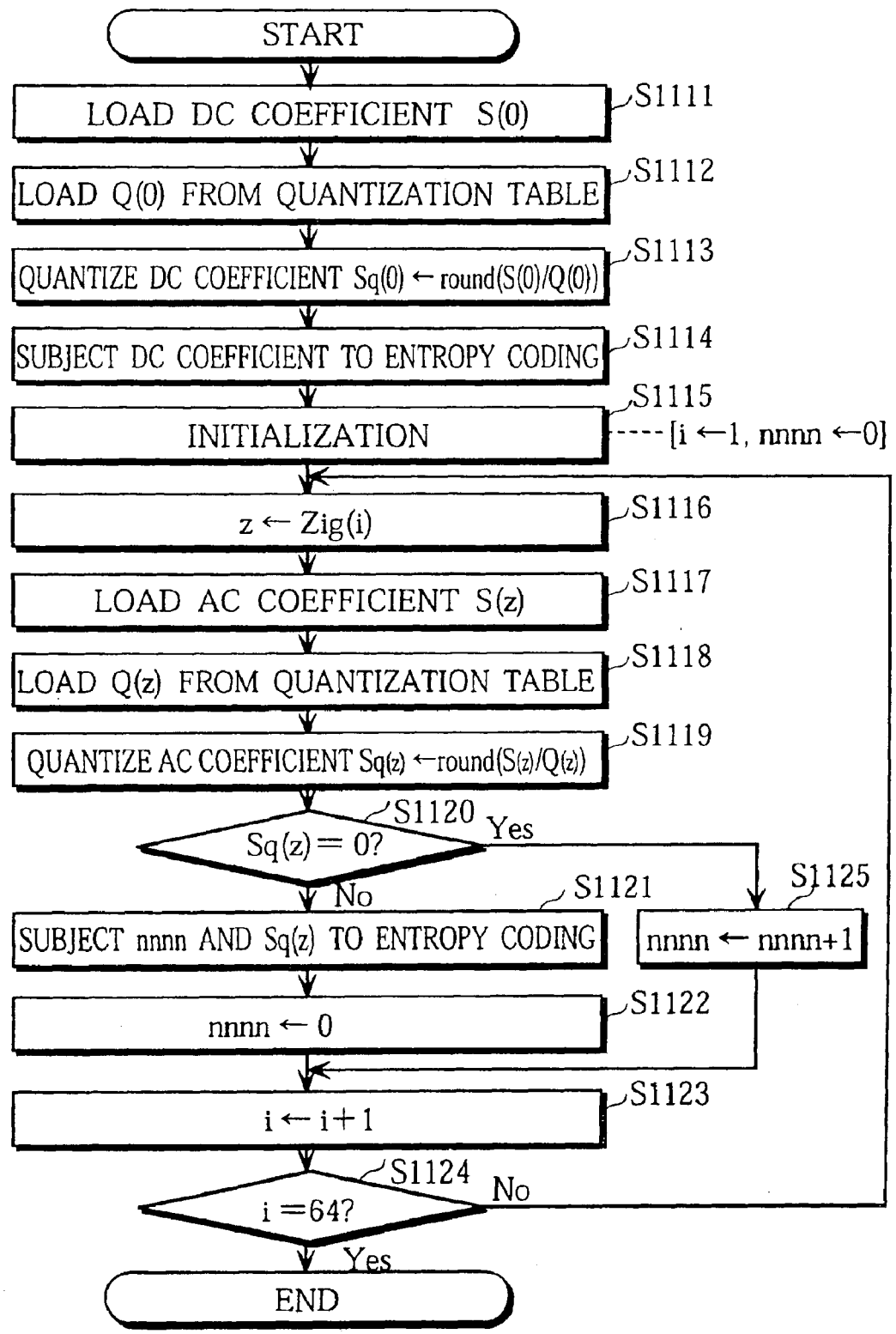
FIG. 14 is a flowchart showing the quantization and entropy coding step in the compression coding procedure of the digital still camera shown in FIG. 12.

The following is a description of the differences between the operation procedure for the quantization and entropy coding step in the compression coding operation of the digital still camera shown in FIG. 12 and the conventional technique, with reference to the flowchart shown in FIG. 14. Note that the operation described below is performed by the microcomputer 1119.

The DCT coefficient $S(0)$ of a DC component is loaded from the memory (Step S1111), the element $Q(0)$ in the quantization table is loaded from the memory (Step S1112), the quantized DCT coefficient $Sq(0)$ of the DC element is calculated by quantizing the DCT coefficient $S(0)$ using $Sq(0)=\text{round}(S(0)/Q(0))$ (Step S1113), and the quantized DCT coefficient $Sq(0)$ is subjected to the entropy coding to generate a code value (Step S1114).

With regard to each of 63 DCT coefficients of AC components, the scan order "z" corresponding to the loop counter "i" is obtained using the zigzag function Zig( ) for generating a scan order used to perform a zigzag scan on the AC components (Step S1116). Using this scan order "z," the DCT coefficient $S(z)$ of an AC component is loaded from the memory (Step S1117) and its corresponding element $Q(z)$ in the quantization table is loaded from the memory (Step S1118). The DCT coefficient $S(z)$ is quantized using $Sq(z)=\text{round}(S(z)/Q(z))$ to calculate the quantized DCT coefficient $Sq(z)$ (Step S1119). If the $Sq(z)$ of a quantized AC component is not zero (Step S1120), values of the zero coefficient run counter "nnnn" and of the $Sq(z)$ are subjected to the entropy coding to generate a code value (Step S1121) and the zero coefficient run counter "nnnn" is initialized to be set to the value "0" (Step S1122); if the $Sq(z)$ of the quantized AC component is zero (Step S1120), the zero coefficient run counter "nnnn" is incremented by one (Step S1125).

The loop counter "i" is incremented by one (Step S1123). If the value of the loop counter "i" is 64, this process has been performed on one block; if not, the operation returns to Step S1116 to repeat the entropy coding process on remaining AC components in the block.

(3) Specific Embodiment of Quantization and Entropy Coding

The following description concerns the process procedure for the quantization and entropy coding described above using specific values of DCT coefficients. Note that the following operation is performed by the microcomputer 1119.

FIG. 15 shows an example of DCT coefficients. The DCT coefficients are calculated by performing the discrete cosine transform on each element composing a block cut out of an image to be compressed and coded. FIG. 16 shows an example of the quantization table composed of 64 elements of 8 elements×8 elements.

The DCT coefficients shown in FIG. 15 are subjected to the quantization and entropy coding using the quantization table shown in FIG. 16.

At first, a DCT coefficient is subjected to the quantization. As shown in FIG. 15, the DCT coefficient of the DC element is 123. As can be seen from FIG. 16, the value of its corresponding element in the quantization table is 16. Therefore, the quantized DCT coefficient $Sq(0)$ "8" is obtained from "round (123/16)." This value is subjected to the entropy coding to generate a code value.

In FIG. 15, the DCT coefficient $S(1)$ of the first AC element is "−4." In FIG. 16, its corresponding element $Q(1)$ in the quantization table is "11." Therefore, the quantized DCT coefficient $Sq(1)$ "0" is obtained from "round (−4/11)." In FIG. 15, the DCT coefficient $S(2)$ of the second AC element is "3." In FIG. 16, its corresponding element $Q(2)$ in the quantization table is "12." Therefore, the quantized DCT coefficient $Sq(2)$ "0" is obtained from "round (3/12)." In FIG. 15, the DCT coefficient $S(3)$ of the third AC element is "4." In FIG. 16, its corresponding element $Q(3)$ in the quantization table is "14." Therefore, the quantized DCT coefficient Sq(3) "0" is obtained from "round (4/14)." In FIG. 15, the DCT coefficient S(4) of the fourth AC element is "−30." In FIG. 16, its corresponding element Q(4) in the quantization table is "12." Therefore, the quantized DCT coefficient Sq(4) "−3" is obtained from "round (−30/12)." In this state, the values of "0," "0," "0," and "−3" are obtained as quantized DCT coefficients of AC elements. Therefore, a pair of the zero coefficient run length "3" and the quantized DCT coefficient "−3" is subjected to the entropy coding to generate a code and the generated code is outputted.

In the same manner, the quantization and entropy coding are repeated on all remaining elements shown in FIG. 15 so that the entropy coding is performed on one block of the image and codes corresponding to the block are outputted.

(4) Conclusion

Figure 2:
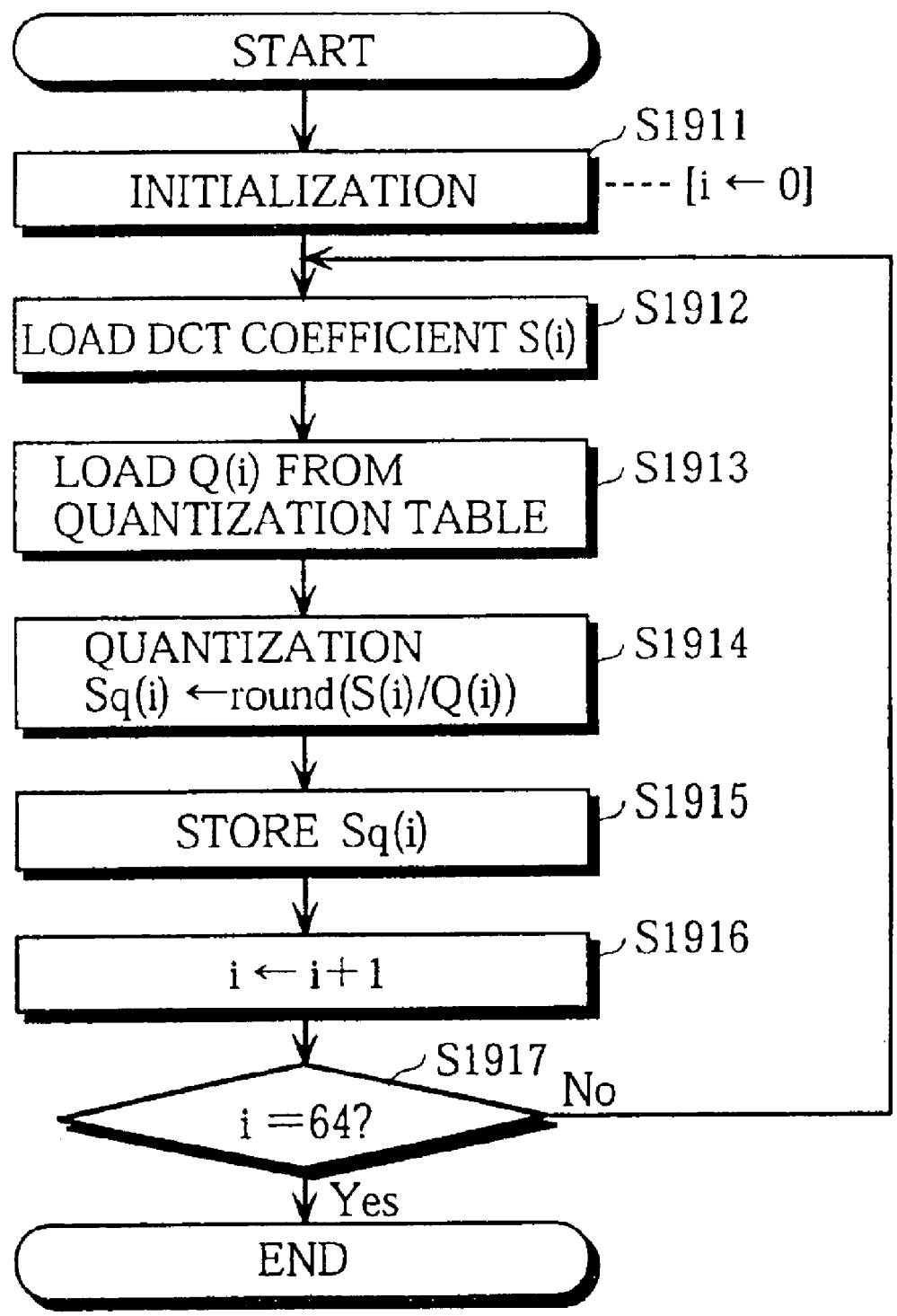
FIG. 2 is a flowchart showing the quantization step in the coding procedure of the conventional image coding apparatus.

As described above, the quantization is also performed in the entropy coding step. As a result, in the present invention, the storing of quantized DCT coefficients and the loop control, namely Steps S1915, S1916, and S1917 in FIG. 2 showing the conventional image compression coding method, can be omitted. Also, the loading of the quantized DCT coefficients, namely Steps S1921 and S1925 in FIG. 3, can be omitted.

In the present invention, if the Sq(z), namely the value of a quantized AC coefficient, is zero (Step S1120), the zero coefficient run counter "nnnn" is incremented by one. In this case, the storing of quantized DCT coefficients and the loop control, namely Steps S1915, S1916, and S1917 in FIG. 2 showing the conventional image compression coding method can be omitted. Also, the loading of the quantized DCT coefficient Sq(z), namely Step S1925 in FIG. 3, can be omitted.

In the case of JPEG, if all remaining AC components are zero during the compression coding, the last non-zero AC component in a target block is coded and an "EOP" code is outputted which shows that all remaining AC components are "0." If the zero run of AC components is "16" or more, a "ZRL" code is outputted which shows that value of the zero run is "16."

Another embodiment may be a recording medium which can be read by a computer and includes a coding program of the above coding method executed by the computer. Also, the coding program may be transmitted via a telecommunication line.

1.2 Procedure for Expansion Decoding

The following is a description of the operation procedure for the expansion decoding by the digital still camera shown in FIG. 12 which is base on the JPEG baseline method, and this description mainly concerns differences between this embodiment and the conventional technique.

(1) Outline of Operation Procedure for Expansion Decoding

Figure 4:
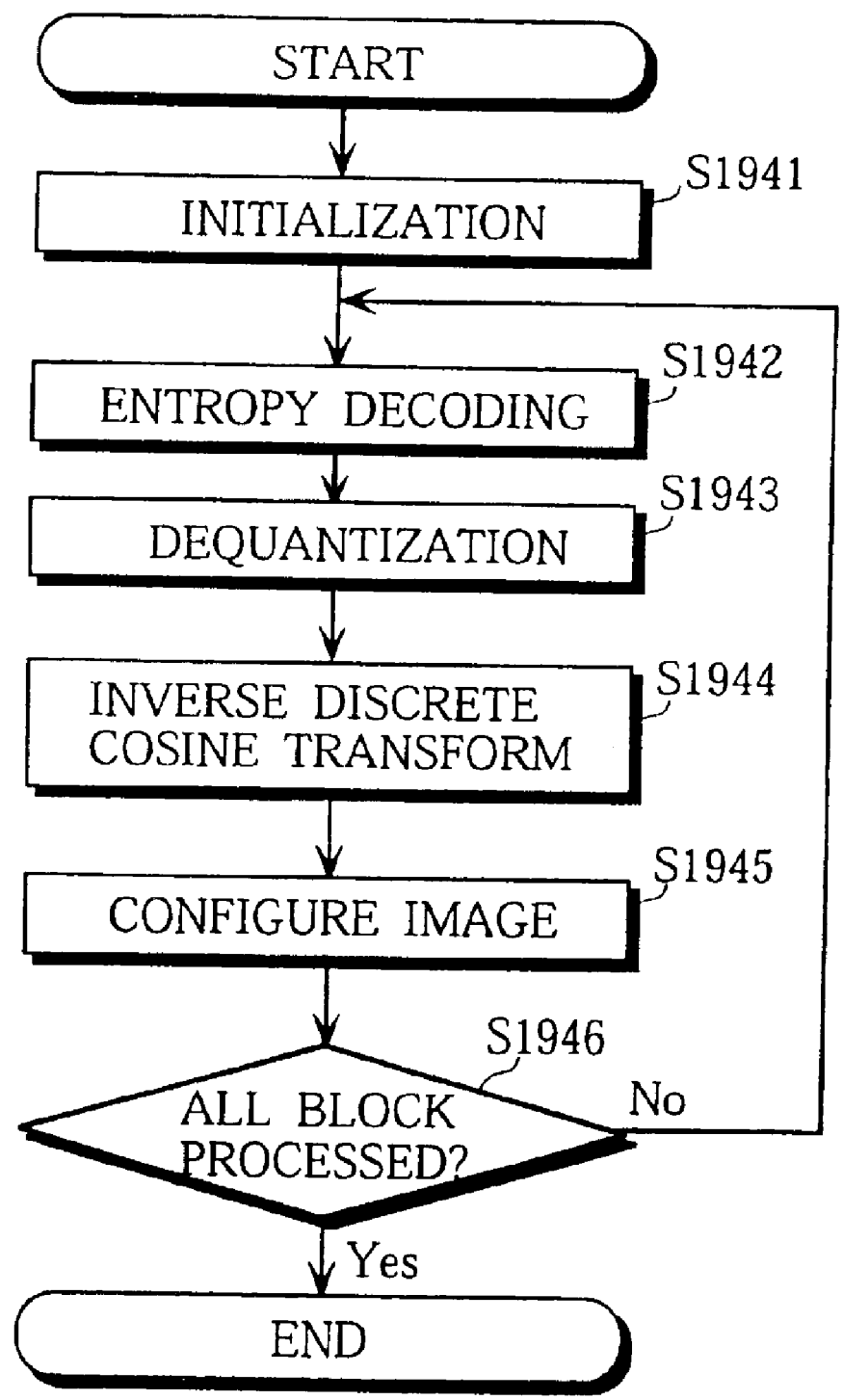
FIG. 4 is a flowchart showing the outline of the expansion decoding procedure of a conventional image decoding apparatus.
Figure 17:
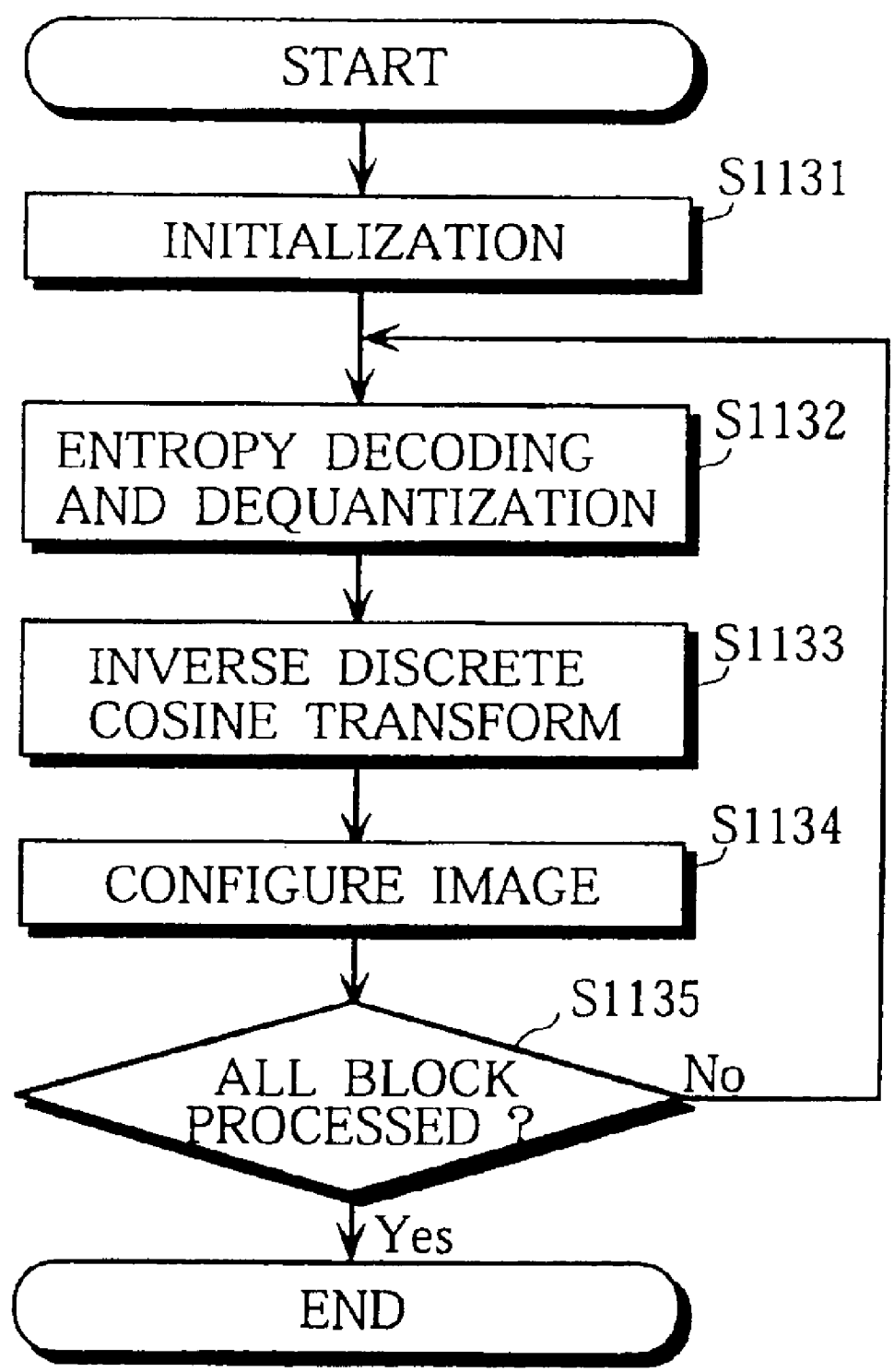
FIG. 17 is a flowchart showing the outline of the expansion decoding procedure of the digital still camera shown in FIG. 12.

FIG. 17 is a flowchart showing the outline of the operation procedure for the expansion decoding by the digital still camera shown in FIG. 12. Note that the following operation is performed by the microcomputer 1119 and the following description mainly concerns differences between this flowchart and that shown in FIG. 4.

In the digital still camera shown in FIG. 12, each code to be decoded is subjected to the entropy decoding and successively to the dequantization on a code-by-code basis (Step S1132). This operation is repeated on all codes corresponding to one block to generate DCT coefficients corresponding to the block. Other steps are the same as those shown in FIG. 4, and therefore are not described here.

(2) Operation Procedure for Entropy Decoding and Dequantization

Figure 18:
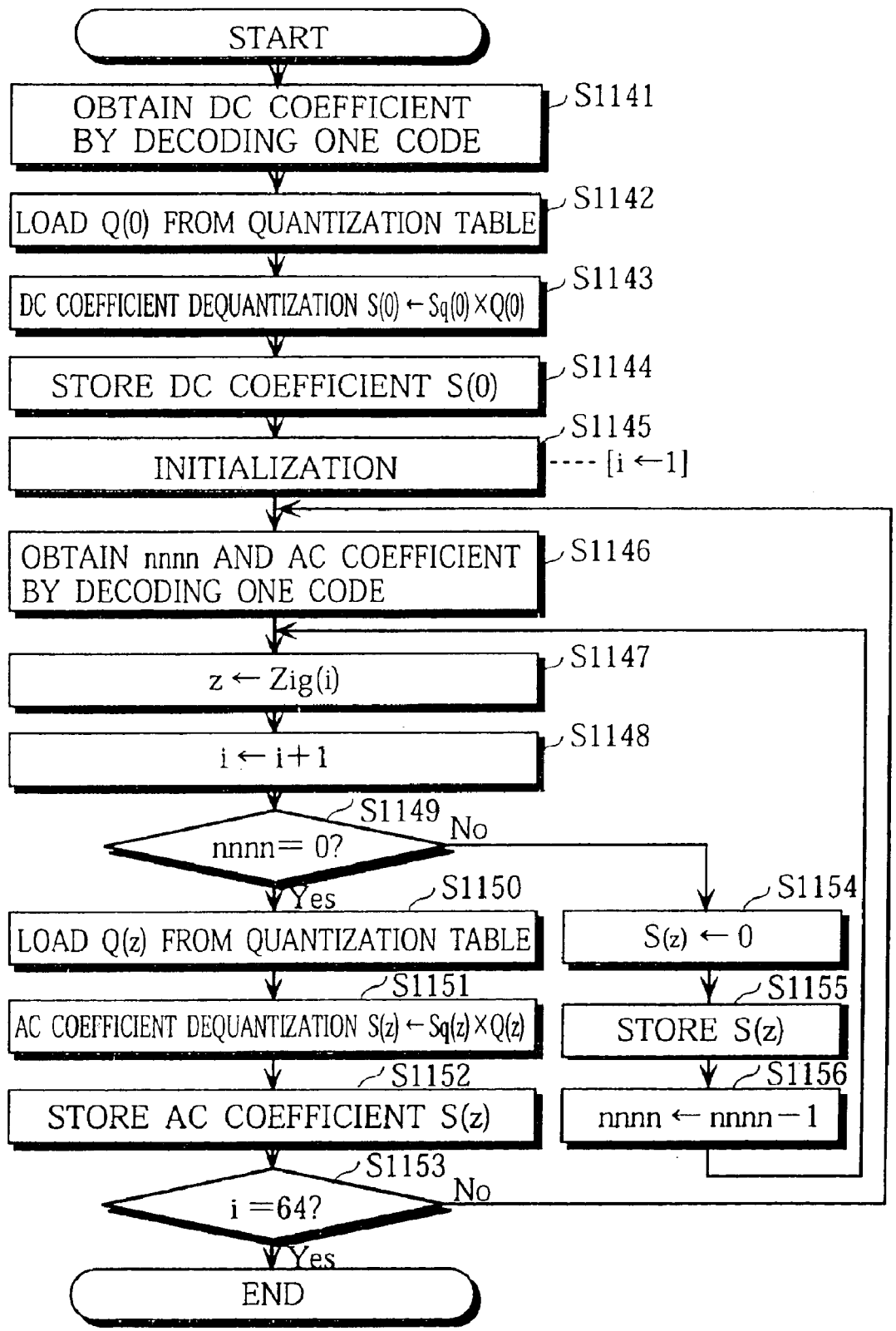
FIG. 18 is a flowchart showing the entropy decoding and dequantization step in the expansion decoding procedure of the digital still camera shown in FIG. 12.

The following is a description of the differences between the expansion decoding operation of the digital still camera shown in FIG. 12 and the conventional technique, with reference to the flowchart in FIG. 18. Note that the following operation is performed by the microcomputer 1119.

One code out of a compression code sequence in which an image is compressed is decoded to generate the quantized DCT coefficient Sq(0) of a DC component (Step S1141), the element Q(0) in the quantization table is loaded from the memory (Step S1142), the DCT coefficient S(0) of the DC component is generated using S(0)=Sq(0)×Q(0) (Step S1143), and the generated DCT coefficient S(0) is stored in the memory (Step S1144).

With regard to each of 63 DCT coefficients of AC components, one code out of the compression code sequence in which an image is compressed is decoded, the value of the zero coefficient run "nnnn" and the quantized DCT coefficient of an AC component are generated (Step S1146), the scan order "z" corresponding to the loop counter "i" is obtained using the zigzag function Zig( ) for generating a scan order used to perform a zigzag scan on the AC components (Step S1147), the value of the loop counter is incremented by one (Step S1148), and whether the value of the zero coefficient run "nnnn" is zero is confirmed. If the zero coefficient run "nnnn" is zero (Step S1149), a corresponding component Q(z) in the quantization table is loaded from the memory (Step S1150), the DCT coefficient S(z) of the AC component is calculated using S(z)=Sq(z)×zQ(z) (Step S1151), and the calculated DCT coefficient S(z) of the AC component is stored in the memory (Step S1152). Whether the value of the loop counter "i" is 64 is confirmed. If the value of the loop counter "i" is 64 (Step S1153), this process is completed; if not (Step S1153), the operation returns to Step S1146 and this process is performed on remaining AC components. If the value of the zero coefficient run "nnnn" is not zero (Step 1149), the DCT coefficient S(z) is set to zero (Step S1154), the DCT coefficient S(z) of the AC component set to zero is stored in the memory (Step S1155), the zero coefficient run "nnnn" is decremented by one, and the operation returns to Step S1147 to repeat this process on remaining AC components.

Note that if an "EOB" is detected as a result of the entropy decoding, "0s" of the number of remaining AC components are outputted as DCT coefficients. If a "ZRL" is detected, sixteen "0s" are outputted.

(3) Specific Embodiment of Entropy Decoding and Dequantization

The following is a description of the process procedure for the entropy decoding and dequantization using specific values. Note that the following operation is performed by the microcomputer 1119.

Quantized DCT coefficients in this description are assumed to be the values shown in FIG. 19. The following description concerns the operation for subjecting these values to the entropy decoding and dequantization using the quantization table shown in FIG. 16. FIG. 20 shows the DCT coefficients obtained after the entropy decoding and dequantization.

A code is subjected to the entropy decoding and a quantized DCT coefficiet "8" is obtained as shown in FIG. 19. As can be seen from FIG. 16, its corresponding element in the quatization table is "16" so that the DCT coefficient "128" shown in FIG. 20 is obtained by multiplying 8 by 16. The following code is subjected to the entropy decoding and the zero run length "3" and the quantized DCT coefficient "−3"

are obtained. Because the zero run length is "3," a "0" is outputted three times as shown in FIG. 20. With regard to the quantized DCT coefficient "−3," its corresponding element "12" in the quantization table shown in FIG. 16 is loaded, its DCT coefficient is calculated by multiplying −3 by 12, and the value "−36" is outputted as shown in FIG. 20.

In this manner, the entropy decoding and dequantization are successively repeated. If an "EOB" code is detected, a "0" is outputted to each remaining DCT coefficients.

(4) Conclusion

Figure 5:
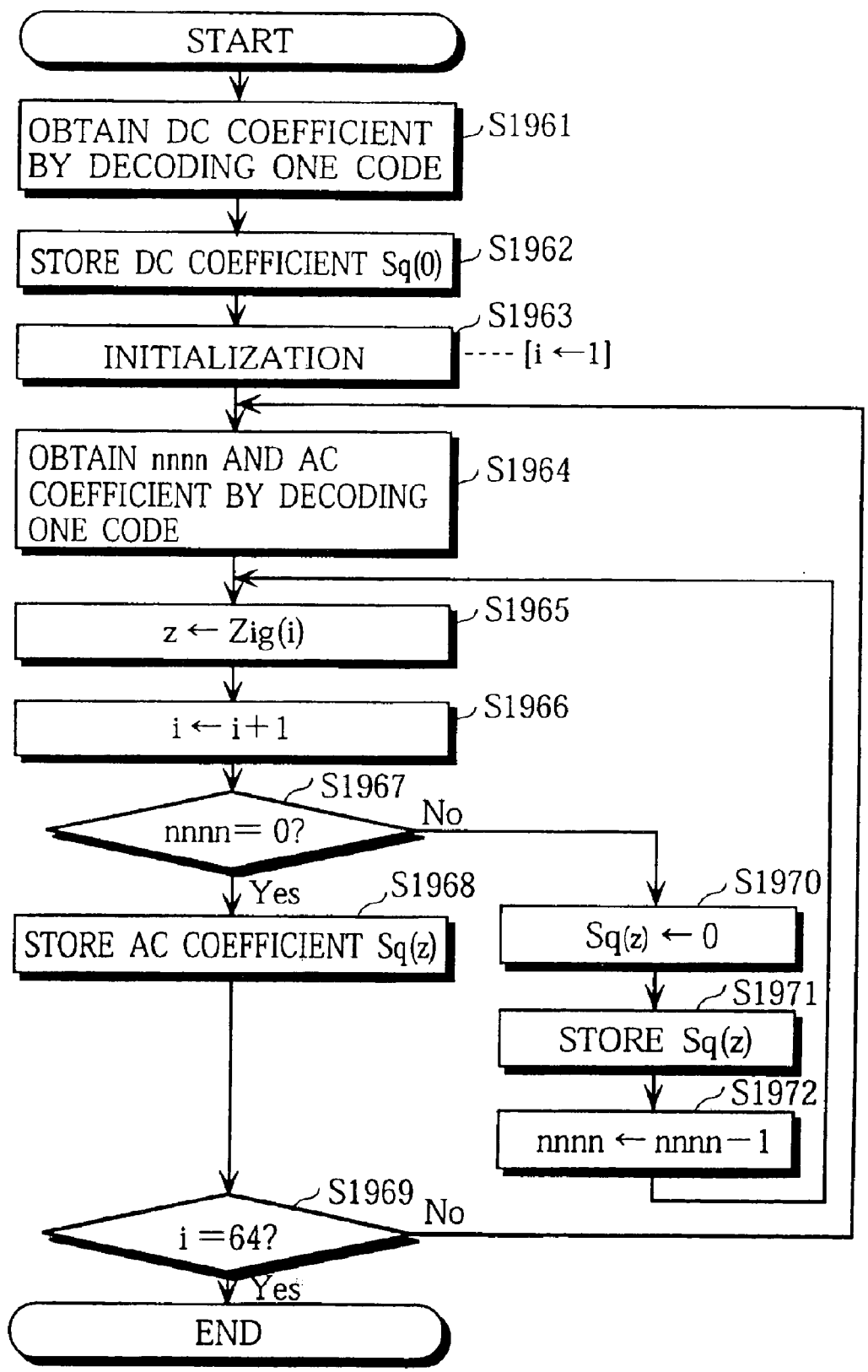
FIG. 5 is a flowchart showing the entropy decoding step in the expansion decoding procedure of the conventional image decoding apparatus.
Figure 6:
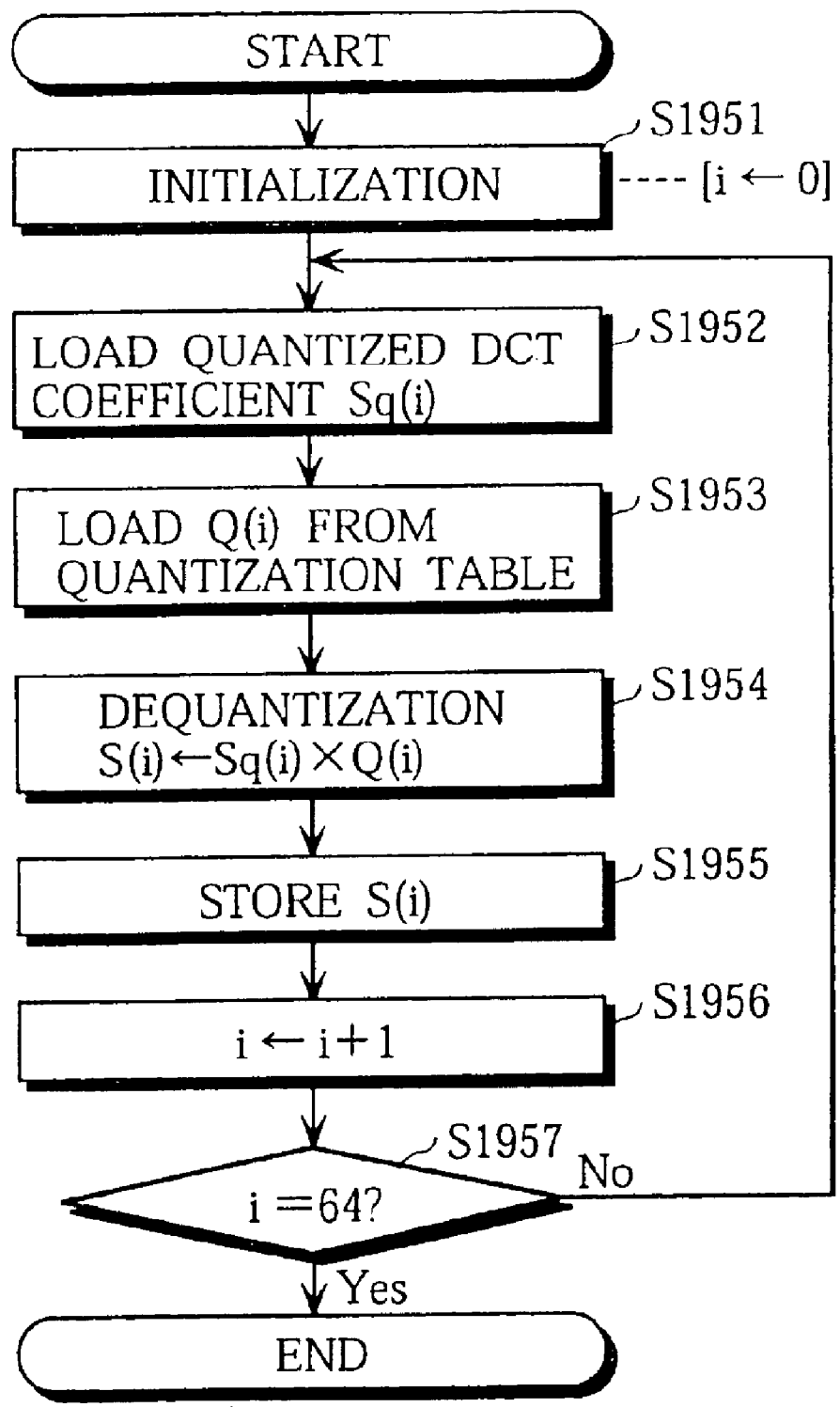
FIG. 6 is a flowchart showing the dequantization step in the expansion decoding procedure of the conventional image decoding apparatus.
Figure 7:
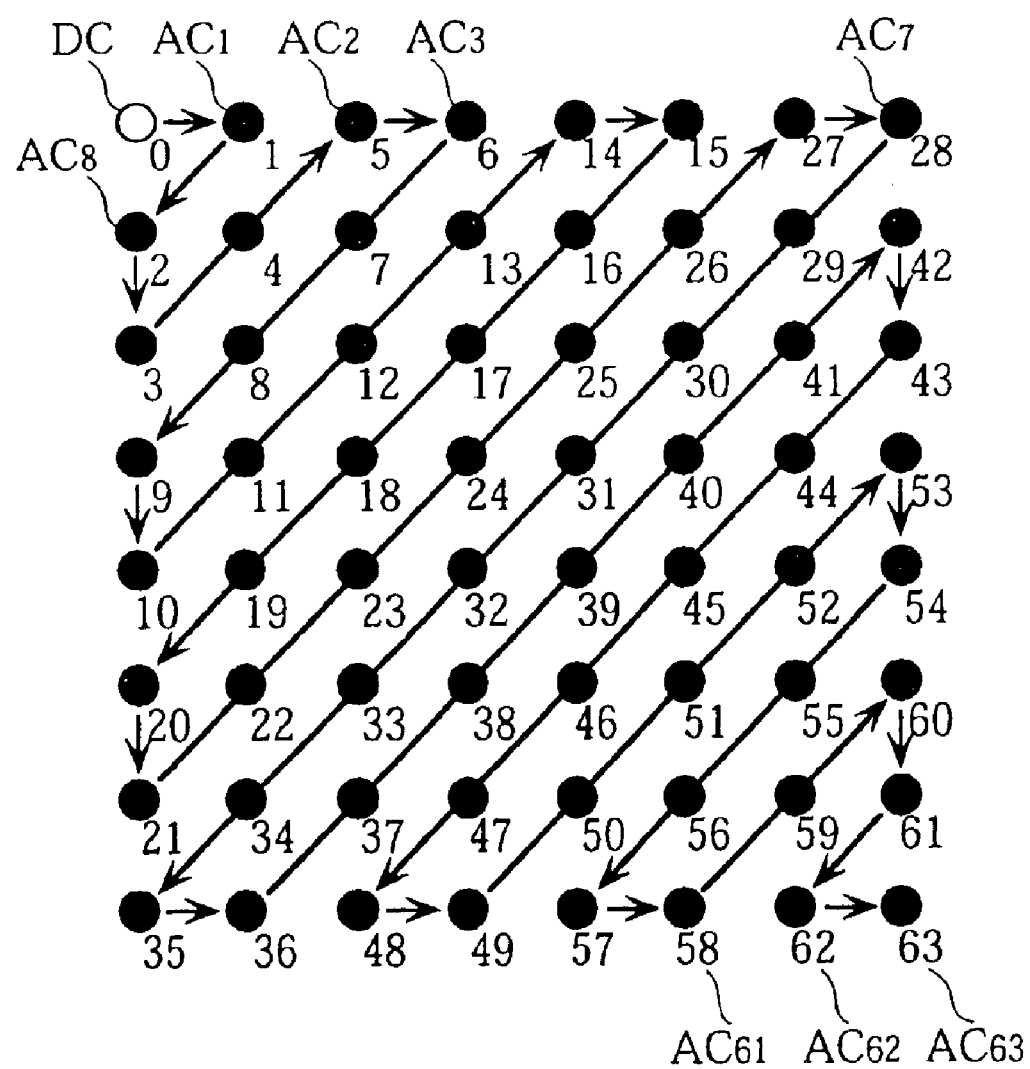
FIG. 7 shows the order of a zigzag scan on DCT coefficients and quantized DCT coefficients.
Figure 9:
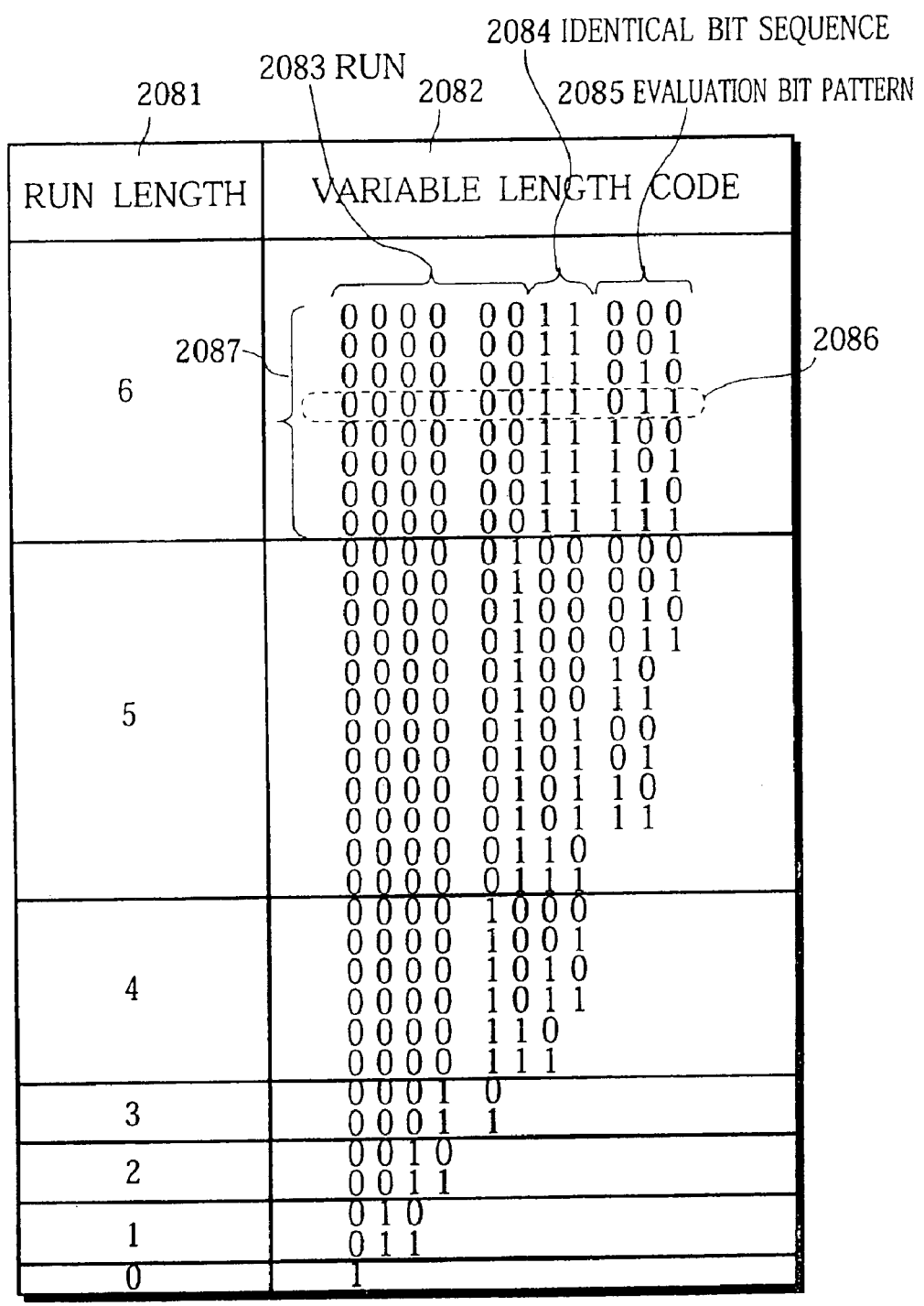
FIG. 9 shows the principle of the conventional entropy decoding of variable length codes.
Figure 10:
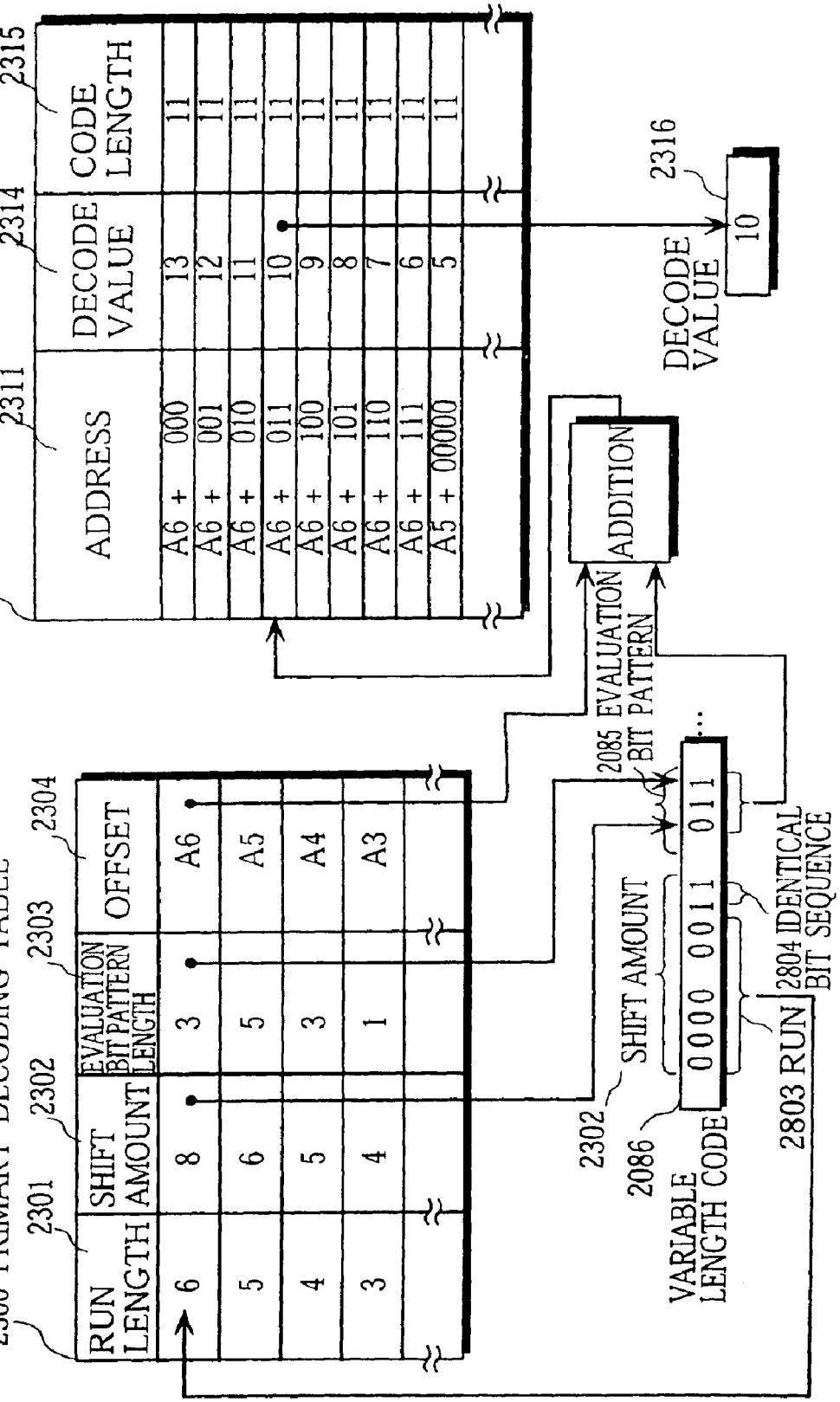
FIG. 10 shows conventional decoding tables used to perform the entropy decoding on variable length codes and the outline of the entropy decoding process.

As described above, the entropy decoding and dequantization are successively performed on each code. As a result, in the present embodiment, the storing of quantized DCT coefficients, namely Steps S1962, S1971, and S1968 in FIG. 5 showing a conventional image decoding operation, can be omitted. Also, the loading of quantized DCT coefficients and the loop control, namely Steps S1952, S1956, and S1957 in FIG. 6, can be omitted.

Furthermore, in the present embodiment, with regard to elements in the quantization table corresponding to the quantized DCT coefficients "0," the loading of these elements from the quantization table and dequantization on the quantized DCT coefficients "0" can be omitted.

While the discrete cosine transform is used as the orthogonal transform in this embodiemnt, the discrete transform, Walshe-Hadamard Transform, and Wavelet Transform may be applied to applications using a standard other than JPEG.

Also, in this embodiment, a division is used for the quantization, although a reciprocal multiplication and a shift operation for alignment by decimal point may be used instead of the division.

Still, while the entropy coding is used for the transform coding in this embodiment, an arithmetic coding or a vector quantization may be also employable.

Another embodiment may be a recording medium which can be read by a computer and includes a decoding program of the above decoding method executed by the computer. Also, the decoding program may be transmitted via a telecomunication line.

2. Embodiment 2

The following is a description of an embodiment of the entropy decoding process of the digital still camera shown in FIG. 12, namely Steps S1141 and S1146 in the flowchart shown in FIG. 18. The entropy decoding principle of a code sequence, the structure of decodig tables, the operation of entropy decoding process, the operation of run detection, and examples of the primary decoding table and the secondary decoding table are described with reference to the drawings.

2.1 Principle of Entropy Decoding

The following is a description of the principle of the entropy decoding used for this embodiment.

As shown in FIG. 21, a plurality of variable length codes are divided into groups so that each group includes variable length codes having the same run. Each code of the variable length codes 2057, namely a group of the run length "6," has a unique bit sequence following the run 2052 and the different sign bit 2053 of one bit length (this unique bit sequence will be hereinafter referred to as an evaluation bit pattern). Therefore, each evaluation bit pattern 2054 represents its corresponding variable length code in the group of the run length "6." This principle can be applied to other groups whose run lengths are not "6."

As described above, because the set of a run length and an evaluation bit pattern represents its corresponding variable length code, a decoding table can be made using this characteristic.

In FIG. 21, the group of the run length "4" includes variable length codes of different bit lengths. The method of setting the evaluation bit pattern in this case is described below.

In this figure, the bit length of each variable length code 2088 is "8" and the bit lengths of the variable length codes 2089*a* and 2089*b* are "7" in this group of the run length "4." In this case, the above method of setting the evaluation bit pattern produces two types of evaluation bit patterns, that is, 2-bit evaluation bit patterns and 3-bit evaluation bit patterns. To prevent such situation, each 2-bit evaluation bit pattern is supplied with one bit to become a 3-bit evaluation bit pattern.

Figure 22:
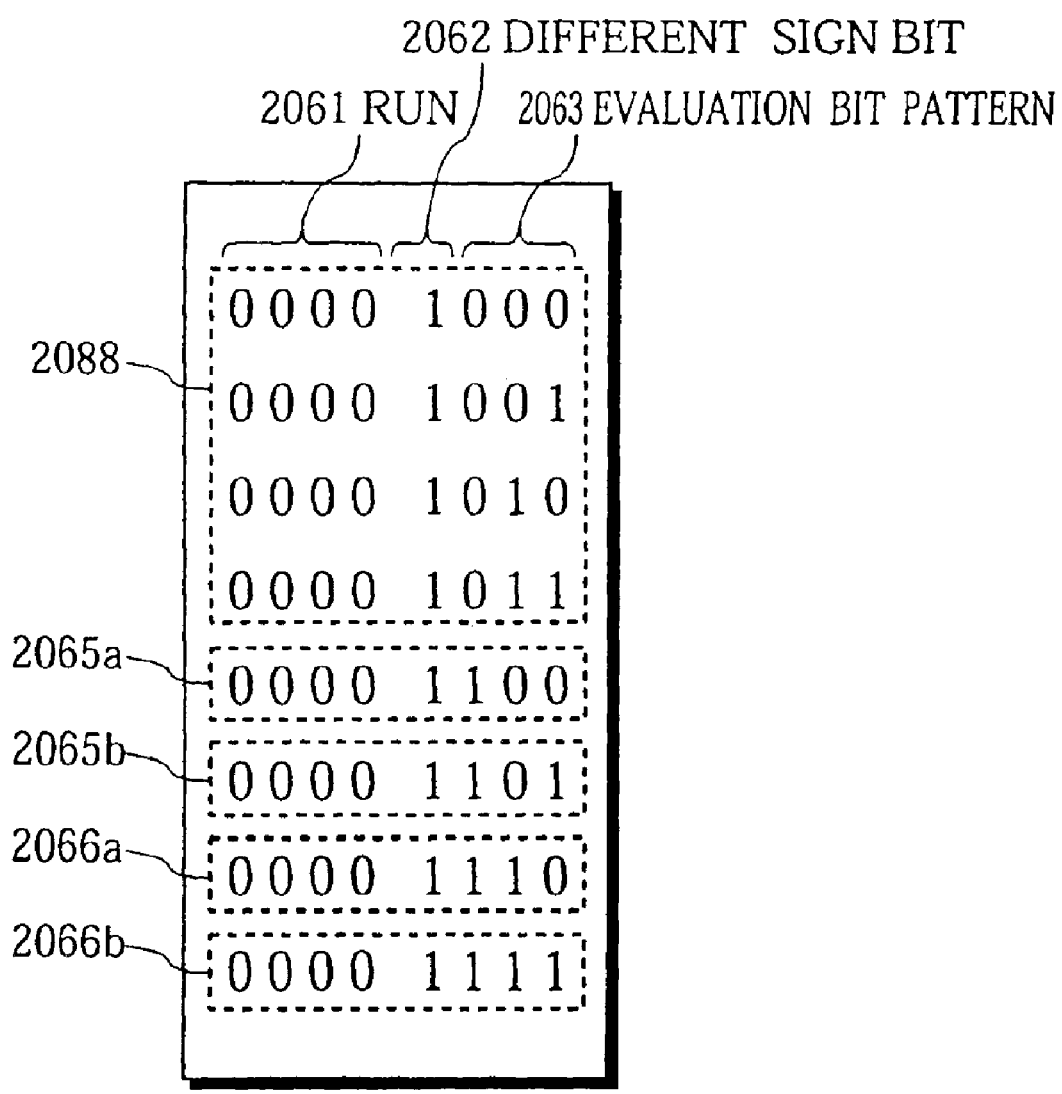
FIG. 22 shows the principle of the entropy decoding of the digital still camera shown in FIG. 12.

FIG. 22 shows the variable length codes 2089*a* and 2089*b* supplied with one bit. The variable length code 2089*a* "0000110" is supplied with "0" and "1" to be the variable length code "00001100" 2065*a* and the variable length code "00001101" 2065*b*, respectively. Also, the variable length code 2089*b* "0000111" is supplied with "0" and "1" to be the variable length code "00001110" 2066*a* and the variable length code "00001111" 2066*b*, respectively.

By doing so, even if the bit lengths of variable length codes having the same run length are different from each other, evaluation bit patterns can be set in the same length.

It should be noted here that the "evaluation bit pattern" in this embodiment is different from that in Japanese Laid-Open Patent Application No. 6-44039 in the principle.

2.2 Structure of Decoding Table

The following is a description of the structure of a decoding table using the principle of the above-mentioned entropy decoding of this embodiment.

Figure 23:
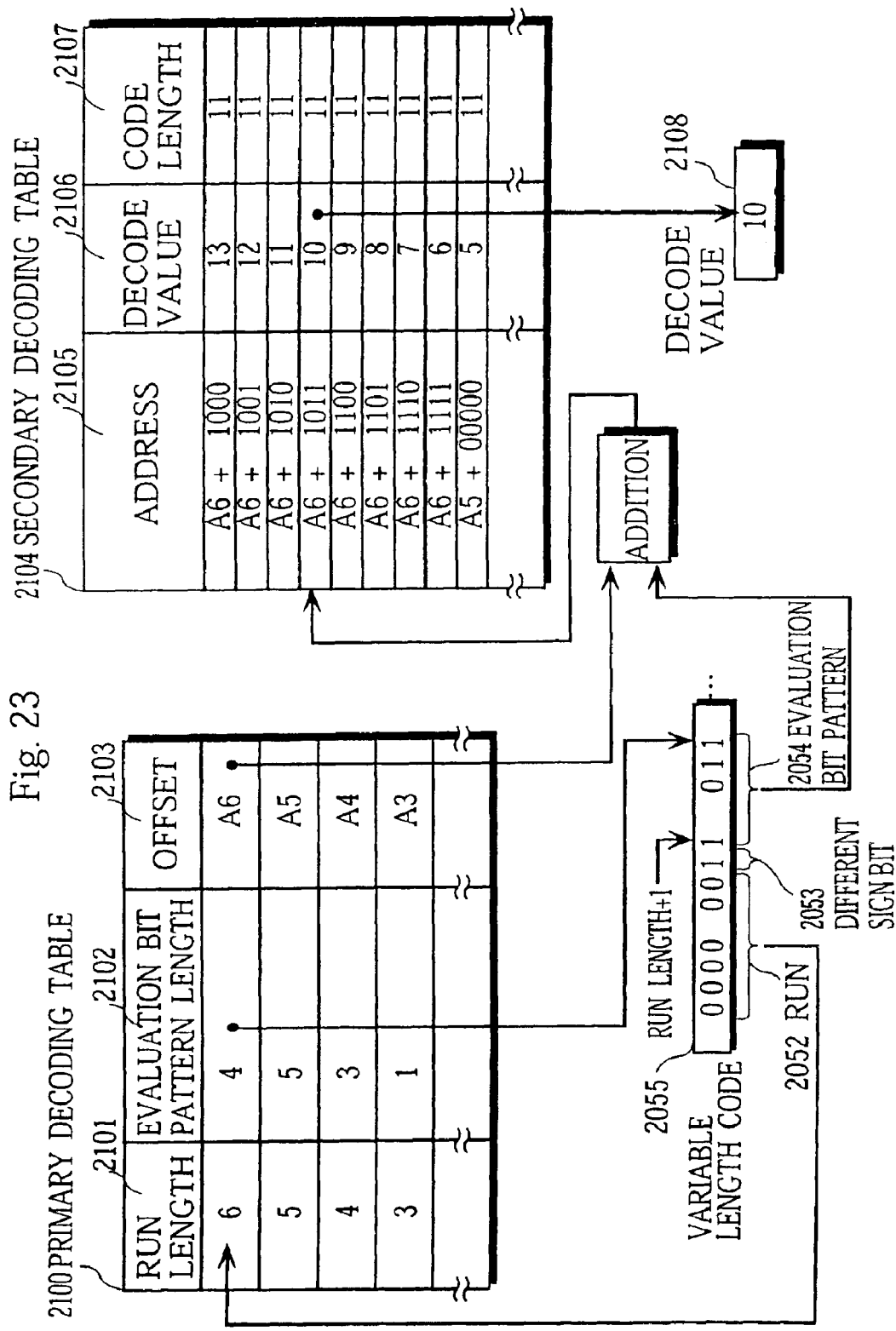
FIG. 23 shows the decoding tables and the outline of the entropy decoding process of the digital still camera shown in FIG. 12.

FIG. 23 shows an example of the decoding table of this embodiemnt and the decoding table includes the primary decoding table 2100 and the secondary decoding table 2104.

The primary decoding table 2100 is a two-dimentional data table storing pairs of an evaluation bit pattern length 2102 and an offset 2103. Each run length 2101 is a bit length of a run and is also used as an address specifying one of the pairs in a line of the primary decoding table 2100. Each evaluation bit pattern length 2102 is a bit length of an evaluation bit pattern. Each offset 2103 is a value related to the addressing in the secondary decoding table 2104 and an additional value obtained by adding an offset 2103 to a bit pattern is an address specifying one decode value in the secondary decoding table 2104.

The secondary decoding table 2104 is a two-dimensional data table storing pairs of a decode value 2106 and a code length 2107. Each address 2105 is an additional value obtained by adding an offset 2103 to a bit pattern and is also used as an address specifying one of the pairs in a line of the secondary decoding table 2104. Each decode value 2106 is a decode value of a variable length code. Each code length 2107 is a bit length of a variable length code.

The following is a description of the relation among the valiable length code 2055, the primary decoding table 2100, and the secondary decoding table 2104, with reference to FIG. 23. In this description, the variable length code "0000 0011 011" 2055 is extracted from a code sequence and the variable length code 2055 is subjected to the entropy decoding.

Because each bit of the 6-bit sequence from the most significant bit is a "0," the run length of the variable length code 2055 is "6." The primary decoding table 2100 is searched using this run length "6" and the evaluation bit pattern length "4" 2102 and the offset "A6" 2103 are obtained. The head bit of the evaluation bit pattern is obtained by adding the run length "6" to a constant of "1."

By confirming the head bit of the evlauation bit pattern and the length of the evaluation bit pattern, the evaluation bit pattern 2054 is found to be "1011" in the code sequence. The evaluation bit pattern "1011" 2054 is added to the offset "A6" 2103, the secondary decoding table 2104 is searched using the addition result of "A6+1011" as an address, and the decode value "10" 2108 is obtained.

2.3 Procedure for Entropy Decoding Process

Figure 24:
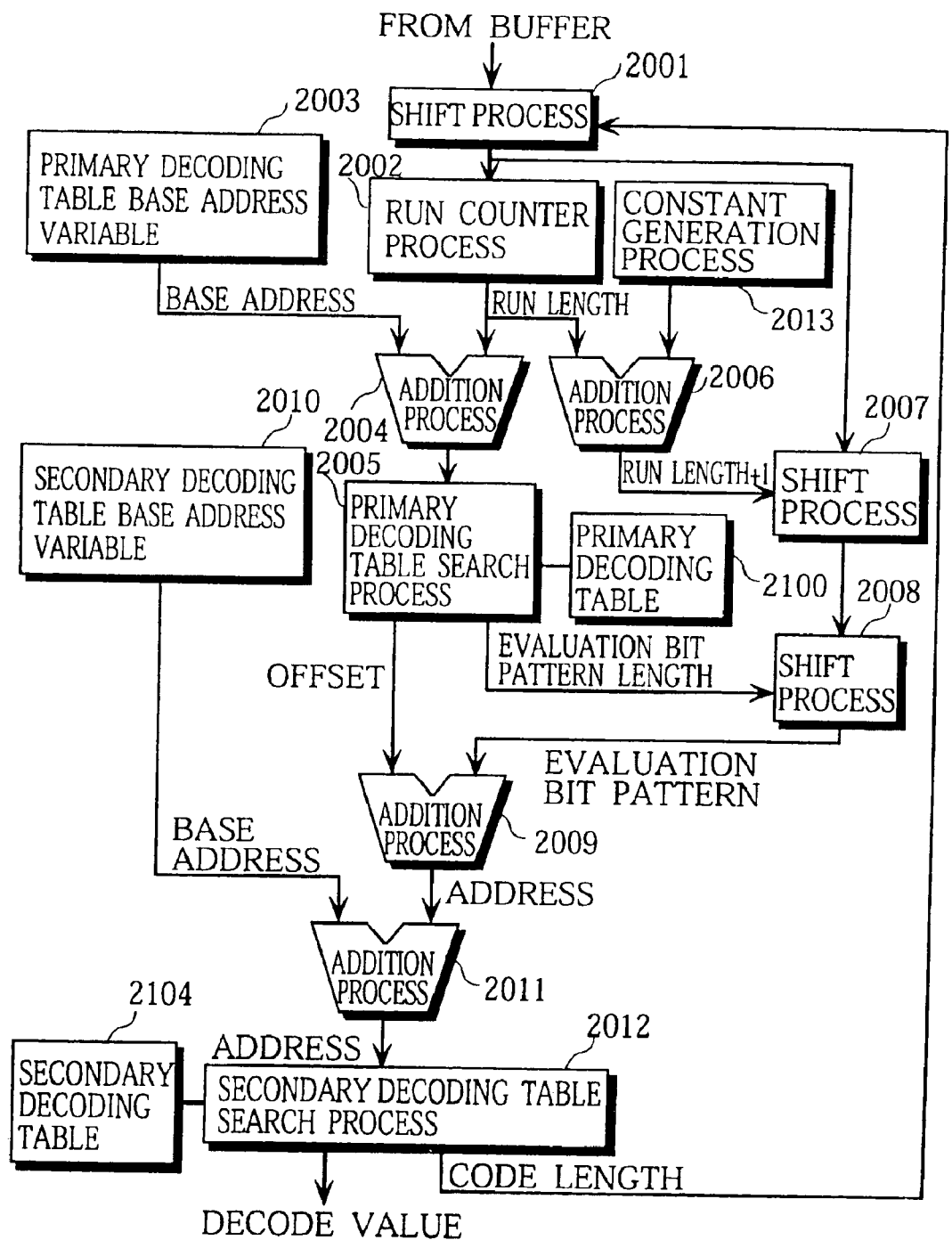
FIG. 24 is a functional block diagram of the entropy decoding process of the digital still camera shown in FIG. 12.

FIG. 24 is a functional block diagram of the entropy decoding process shown in the flowchart of FIG. 18 as Steps S1141 and S1146.

The decoding process shown in FIG. 24 includes the shift process 2001, the run counter process 2002, the constant generation process 2013, the addition process 2006, the shift process 2007, the shift process 2008, the primary decoding table search process 2005, the addition process 2009, the addition process 2011, and the secondary decoding table search process 2012. This decoding process uses the primary decoding table base address variable 2033, the secondary decoding table base address variable 2010, the primary decoding table 2100, and the secondary decoding table 2104.

Note that the following processes are performed by the microcomputer 1119.

In the shift process 2001, a bit sequence is fetched from a buffer accumulating variable length codes to be decoded, the fetched bit sequence is shifted to the left by any number of bits so that a decoding start bit is shifted to the most significant bit, and a result of the left shift is outputted to the run counter process 2002 and the shift process 2007.

In the run counter process 2002, the number of successive bits of the same sign "0" or "1" from the most significant bit (a run length) of a variable length code outputted from the shift process 2001 is counted, and the run length is outputted to the addition processes 2004 and 2006.

The primary decoding table base address variable 2003 holds a base address showing the start position of the primary decoding table 2100 and this base address is outputted to the addition process 2004.

The secondary decoding table base address variable 2010 holds a base address showing the start position of the secondary decoding table 2104 and this base address is outputted to the addition process 2011.

In the addition process 2004, the base address held by the primary decoding table base address variable 2003 is added to the run length outputted from the run counter process 2002, and the addition result is outputted to the primary decoding table search process 2005.

In the addition process 2006, the run length outputted from the run counter process 2002 is added to a constant "1" outputted from the constant generation process 2013, and the addition result is outputted to the shift process 2007.

In the primary decoding table search process 2005, the primary decoding table 2100 is searched using the run length outputted from the addition process 2004, an offset and an evaluation bit pattern length are obtained, the obtained offset and evaluation bit pattern length are outputted to the addition process 2009 and shift process 2008, respectively.

In the shift process 2007, the variable length code outputted from the shift process 2001 is shifted to the left by the value outputted from the addition process 2006, and the bit sequence subjected to the left shift is outputted to the shift process 2008. By doing so, the head bit of the evaluation bit pattern is shifted to the most significant bit.

In the shift process 2008, the bit sequence outputted from the shift process 2007 is shifted to the right by the evaluation bit pattern length outputted from the primary decoding table search process 2005. As a result, an evaluation bit pattern is obtained. This evaluation bit pattern is outputted to the addition process 2009.

In the addition process 2009, the offset outputted from the primary decoding table search process 2005 is added to the evaluation bit pattern outputted from the shift process 2008, and the bit sequence obtained after this addition is outputted to the addition process 2011.

In the addition process 2011, the base address held by the secondary decoding table base address variable 2010 is added to the bit sequence outputted from the addition process 2009, and a bit sequence obtained after this addition is outputted to the secondary decoding table search process 2012 as an address.

In the secondary decoding table search process 2012, the secondary decoding table 2104 is searched using the address outputted from the addition process 2011 and a decode value and a code length are obtained. The obtained code length is outputted to the shift process 2001, where the obtained code length is used to determine the head bit of the next variable length code.

2.4 Successive Operation Procedure for Entropy Decoding Process

Figure 25:
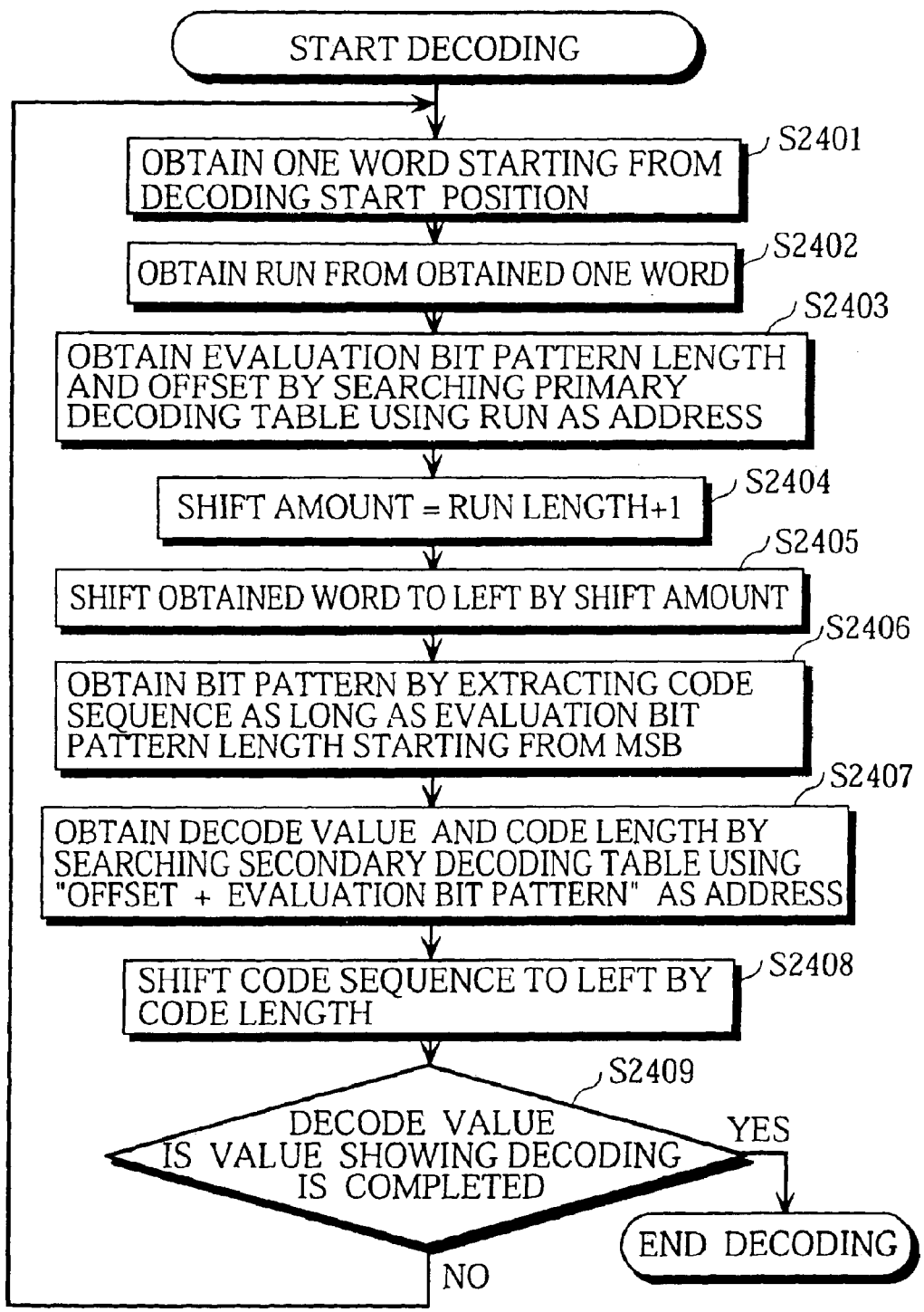
FIG. 25 is a flowchart showing the entropy decoding procedure for the digital still camera shown in FIG. 12.

The following is a description of the successive operation procedure for the entropy decoding process shown in FIG. 24, with reference to the flowchart shown in FIG. 25.

Note that each following step is performed by the microcomputer 1119.

In the shift process 2001, a variable length code of one word is fetched from the buffer accumulating variable length codes to be decoded, with the decoding start bit being shifted to the most significant bit (Step S2401). In the run counter process 2002, the number of successive bits having the same sign of "0" or "1" from the most sgnificant bit (a run length) of a variable length code fetched in the shift process 2001 is obtained (Step S2402). In the primary decoding table search process 2005, the primary decoding table 2100 is searched using the obtained run length to obtain its corresponding offset and evaluation bit pattern length (Step S2403). In the addition process 2006, the run length is added to a constant "1" (Step S2404). In the shift process 2007, the variable length code is shifted to the left by the addition result.(Step S2405). In the shift process 2008, the variable length code is shifted to the right by the evaluation bit pattern length to obtain the evaluation bit pattern (Step S2406). In the secondary decoding table search process 2012, the secondary decoding table 2104 is searched using an addition value obtained by adding the evaluation bit pattern to the offset to obtain a decode value and a code length (Step S2407). The obtained code length is outputted to the shift process 2001, where this code length is used to determine the head bit of the next variable length code and the next variable length code is shifted to the left so that the decoding start position is shifted to the most significant bit (Step S2408). If the obtained decode value is a value showing that the decoding is completed, this decoding process is completed (Step S2409); if not, the operation returns to Step S2401.

2.5 Detection of Run Length

The following is a description of the operation for detecting the run length of a variable length code.

Figure 26:
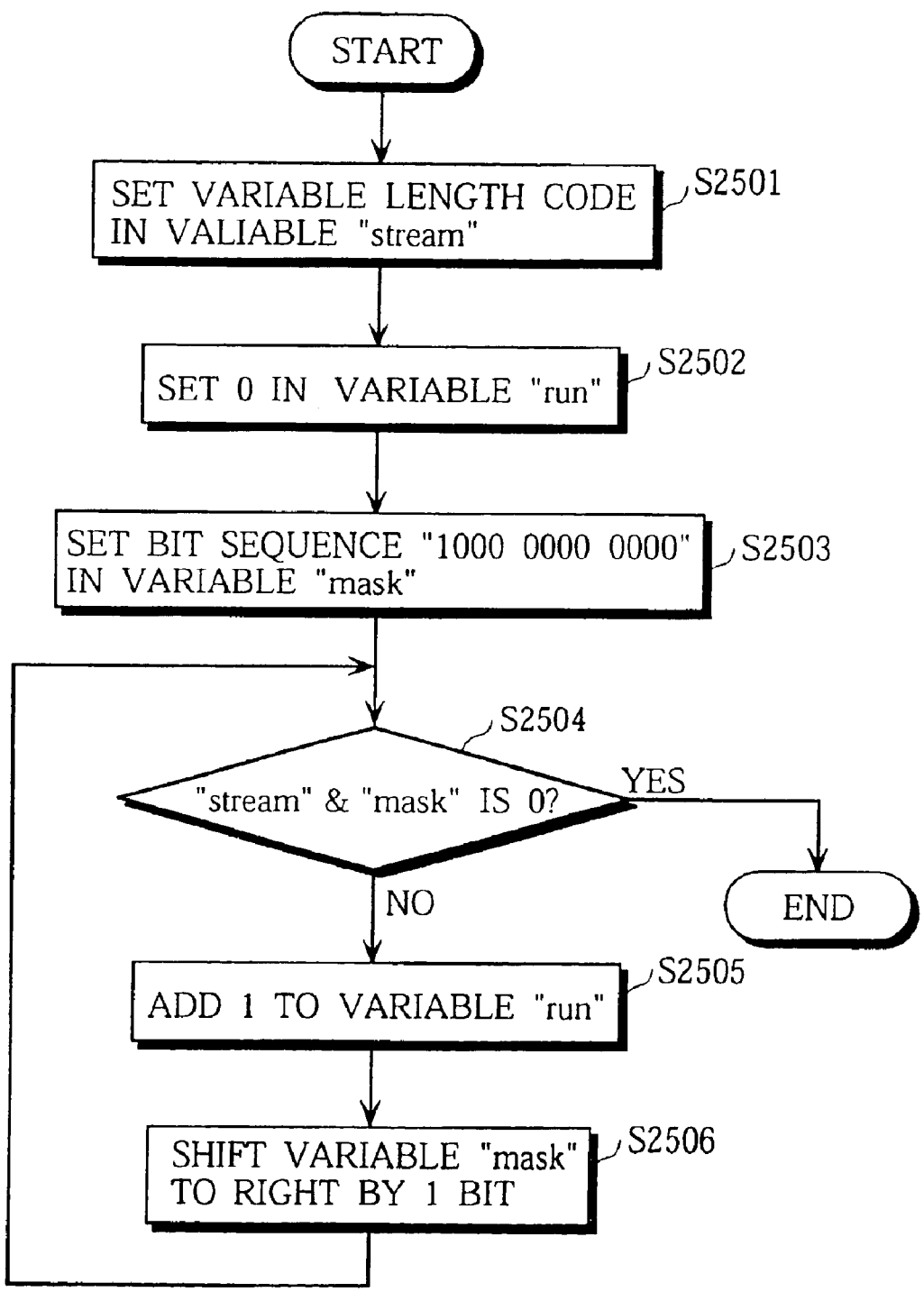
FIG. 26 is a flowchart showing the procedure for detecting runs of the digital still camera shown in FIG. 12.

FIG. 26 is a flowchart showing the operation for detecting the run length composed of bits "1" of a variable length code. Note that each following step is performed by the micromputer 1119.

A variable length code whose run length is to be obtained is set in the variable "stream." After the operation shown in FIG. 26 is completed, an obtained run length is stored in the variable "run."

The microcomputer 1119 sets a variable length code in the variable "stream" (Step S2501), sets "0" in the variable "run" (Step S2502), and sets the bit sequence "1000 0000 0000 0000" in the variable "mask" (Step S2503). The microcomputer 1119 carries out the logical AND between the variable "stream" and the variable "mask." If the result of the logical AND is "0," the microcomputer 1119 completes this run length detection process (Step S2503); if not, the microcomputer 1119 adds "1" to the variable "run" (Step S2505), shifts the variable "mask" to the right by one bit (Step S2506), and returns the operation to Step S2504. In this manner, the run length of a variable length code is stored in the variable "run."

It should be noted here that even if a run length is composed of bits "0," the run length is detected in the same manner. In this case, the microcomputer 1119 carries out the logical AND between the variable "stream" and the variable "mask" and, if the result of the logical AND is "1," the run detection process is completed. Other steps are the same as those described above and therefore are not described here.

Figure 11:
FIG. 11 shows an example of the conventional primary decoding table of variable length codes.
Figure 27:
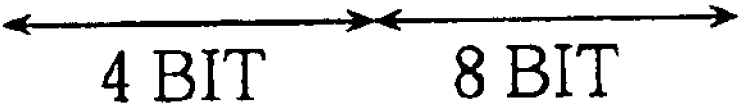
FIG. 27 shows an example of the primary decoding table of the digital still camera shown in FIG. 12.

2.6 Example of Primary Decoding Table and Secondary Decoding Table of the Present Invention FIG. 27 is an example of the primary decoding table used for the decoding process shown in FIG. 18 as Steps S1141 and S1146. This decoding table is made up from variable length codes which are under the same condition as those used for the primary decoding table disclosed in Japanese Laid-Open Patent Application No. 6-44039 shown in FIG. 11. Because the bit width of the evaluation bit pattern length column is 4 bits, the bit width of the offset column is 8 bits, and there are seven types of runs, the size of the primary decoding table shown in FIG. 27 is 84 bits calculated from (4 bits+8 bits)×7 types. FIG. 28 shows the second table. This table is the same as that disclosed by Japanese Laid-Open Patent Application No. 6-44039.

As described above, the present invention produces an effect that the decoding table is made in a small size, compared with the conventional technique.

Although the present invention has been described by way of the above embodiment, it should be noted that the scope of the present invention is not limited to the embodiment. That is to say, the following modifications are included in the present invention.

(1) While variable length codes are decoded in Embodiment 2, fixed length codes may be decoded.

(2) While one decode value is obtained from one code in Embodiment 2, a decode value composed of a zero run length and a non-zero coefficient value may be obtained from one code. In this case, a zero run length and a non-zero coefficient value may be generated as a decode value by, as described in Embodiment 1, relating a code to a decode value composed of a zero run length and a non-zero coefficient value and by subjecting the code to an entropy decoding. As described above, one decode value may be composed of two or more types of information.

(3) A specific entropy decoding process of the image decoding apparatus of Embodiment 1 has been described in Embodiment 2, although this embodiment may be achieved without any image decoding apparatus. Also, this embodiment is not restricted to the decoding of image data and may be applied to the decoding of other information.

(4) While the present embodiment concerns the procedure for an entropy decoding process performed by a microcomputer shown in FIG. 24, the digital still camera may further include the following structure.

Figure 29:
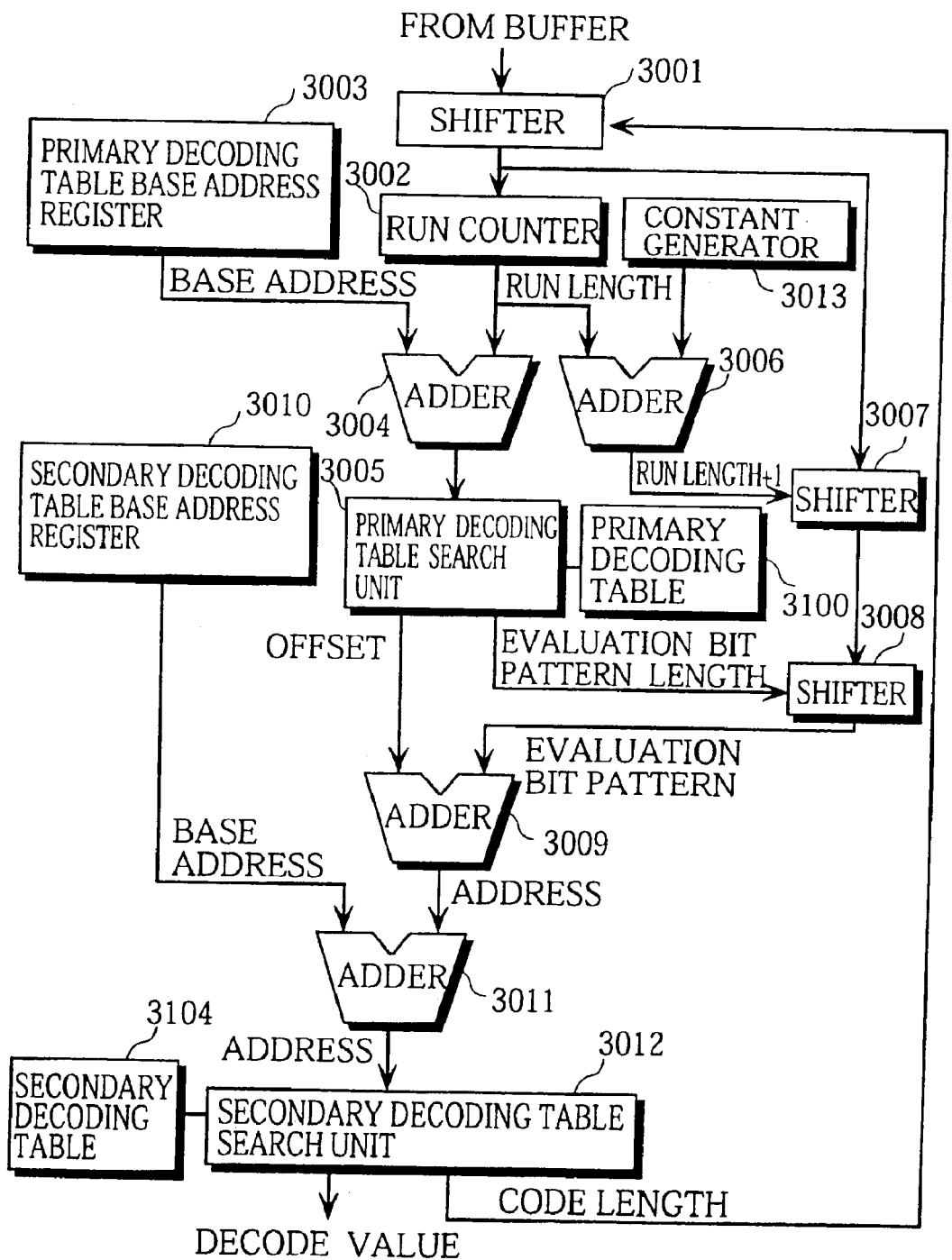
FIG. 29 is a block diagram of the entropy decoding circuit of the digital still camera shown in FIG. 12 of another embodiment.

Instead of the entropy decoding process shown in FIG. 24 performed by a microcomputer, the digital still camera includes a decoding process circuit. As shown in FIG. 29, the decoding process circuit includes the shifter 3001, the run counter 3002, the constant generator 3013, the adder 3004, the adder 3006, the shifter 3007, the shifter 3008, the primary decoding table search unit 3005, the adder 3009, the adder 3011, the secondary decoding table search unit 3012, the primary decoding table base address register 3003, the secondary decoding table base address register 3010, the primary decoding table 3100, and the secondary decoding table 3104.

Note that the microcomputer 1119 controls each unit included in the decoding process circuit to perform the process in the flowchart shown in FIG. 25.

The shifter 3001 fetches a bit sequence from a buffer accumulating variable length codes to be decoded, shifts the fetched bit sequence to the left by any number of bits so that a decoding start bit is shifted to the most significant bit, and outputs a result of the left shift to the run counter 3002 and the shifter 3007.

The run counter 3002 counts the number of successive bits of the same sign "0" or "1" from the most significant bit (a run length) of a variable length code outputted from the shifter 3001, and outputs the run length to the adders 3004 and 3006.

The constant generator 3013 generates a constant "1" and outputs the constant to the adder 3006.

The primary decoding table base address register 3003 holds a base address showing the start position of the primary decoding table 3100 and this base address is outputted to the adder 3004.

The secondary decoding table base address register 3010 holds a base address showing the start position of the secondary decoding table 3104 and this base address is outputted to the adder 3011.

The adder 3004 adds the base address held by the primary decoding table base address register 3003 to the run length outputted from the run counter 3002, and outputs the addition result to the primary decoding table search unit 3005.

The adder 3006 adds the run length outputted from the run counter 3002 to a constant "1" outputted from the constant generator 3013, and outputs the addition result to the shifter 3007.

The primary decoding table search unit 3005 searches the primary decoding table 3100 using the run length outputted from the adder 3004, obtains its corresponding offset and evaluation bit pattern length, and outputs the obtained offset and evaluation bit pattern length to the adder 3009 and the shifter 3008, respectively.

The shifter 3007 shifts the variable length code outputted from the shifter 3001 to the left by the value outputted from the adder 3006, and outputs a bit sequence obtained after the left shift to the shifter 3008. By doing so, the head bit of the evaluation bit pattern is shifted to the most significant bit.

The shifter 3008 shifts the bit sequence outputted from the shifter 3007 to the right by the evaluation bit pattern length outputted from the primary decoding table search unit 3005. As a result, an evaluation bit pattern is obtained. This evaluation bit pattern is outputted to the adder 3009.

The adder 3009 adds the offset outputted from the primary decoding table search unit 3005 to the evaluation bit pattern outputted from the shifter 3008, and outputs the bit sequence obtained after the addition to the adder 3011 as an address.

The adder 3011 adds the base address held by the secondary decoding table base address register 3010 to the address outputted from the adder 3009, and outputs the addition result as an address to the secondary decoding table search unit 3012.

The secondary decoding table search unit 3012 searches the secondary decoding table 3104 using the address outputted from the adder 3011 and obtains a decode value and a code length. The obtained code length is outputted to the shifter 3001, in which the obtained code length is used to determine the head bit of the next variable length code.

(5) Another embodiment may be a recording medium which can be read by a computer and includes a decoding program of the above decoding method executed by the computer. Also, the decoding program may be transmitted via a telecomunication line.

3. Embodiment 3

The following description concerns an embodiment of a specific operation of the entropy decoding process of the digital still camera shown in FIG. 12 in the flowchart in FIG. 18 as Steps S1141 and 1146. The principle of the entropy decoding, the structure of the decoding table, the operation of the entropy decoding process, and examples of the primary and secondary decoding tables are explained with reference to the drawings.

3.1 Principle of Entropy Decoding

The following description concerns the principle of the entropy decoding of the present embodiment.

Figure 30:
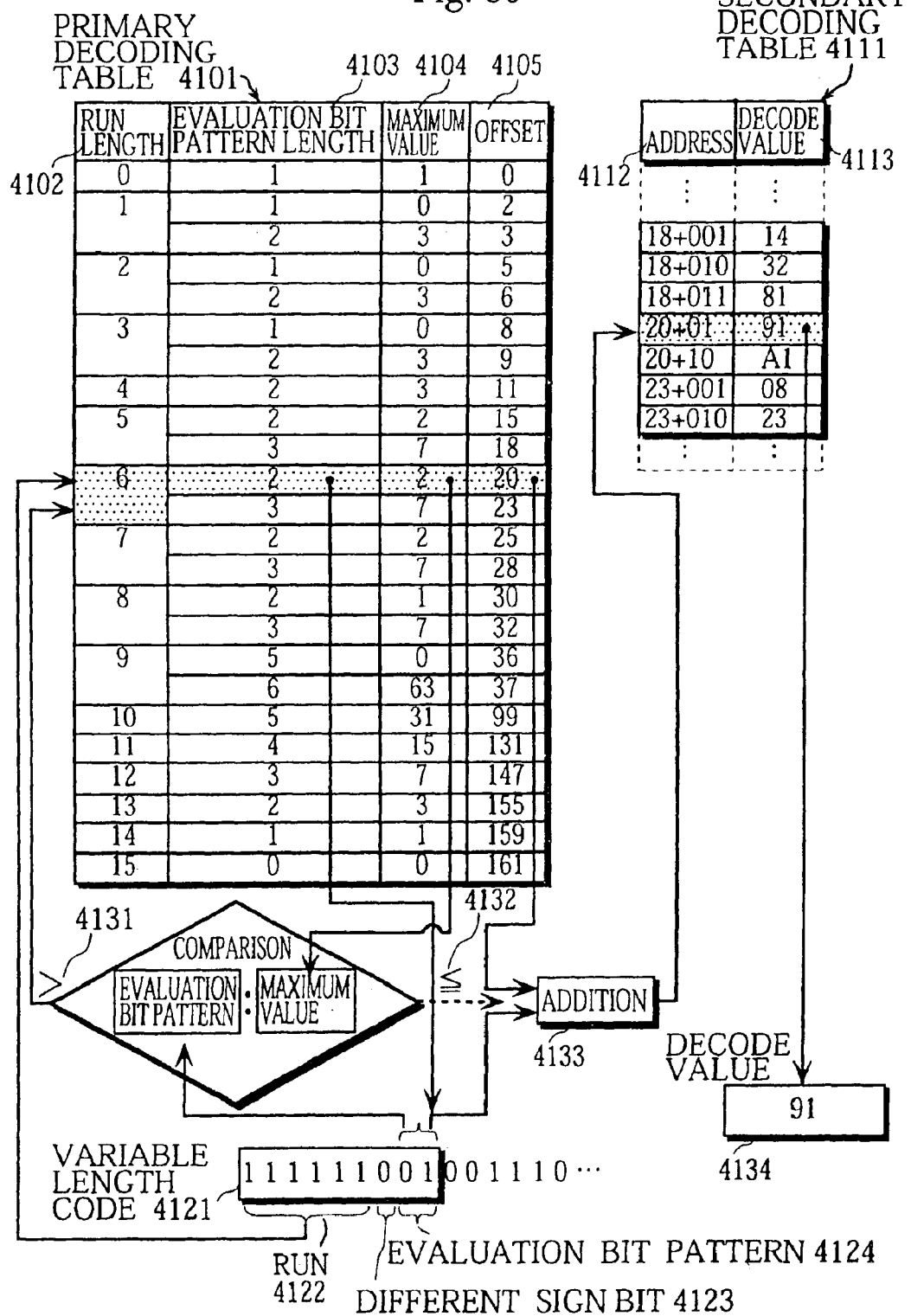
FIG. 30 shows the principle of the entropy decoding process of the digital still camera shown in FIG. 12 of the other embodiment.

FIG. 30 shows the principle of the entropy decoding of the present embodiment.

(1) Structure of Decoding Table

As shown in FIG. 30, the decoding table is composed of the primary decoding table 4101 and the secondary decoding table 4111.

The primary decoding table 4101 is a two-dimentional data table storing a plurality of sets which are each composed of an evaluation bit pattern length 4103, a maximum value 4104, and an offset 4105.

Each run length 4102 is a bit length of a run and is also used as an address specifying one of the plurality of sets in a line of the primary decoding table 4101.

Here, the run is a part of the bit sequence of a variable length code and is a sequence of same bits from the start of the variable length code. The run in this embodiment is a sequence of bits "1."

Each evaluation bit pattern length 4103 is a bit length of an evaluation bit pattern. Each evaluation bit pattern is a bit sequence following a bit which follows the run of a variable length code.

Each maximum value 4104 is a maximum value among a group of evaluation bit patterns of variable length codes of the same run length and code length.

Each offset 4105 is a value related to the addressing in the secondary decoding table 4111. Each addition value obtained by adding an offset 4105 to an evaluation bit pattern is an address specifying a decode value in a line of the secondary decoding table 4111.

The primary decoding table 4101 allocates each line to hold data of one code group of the same run length and code length.

The secondary decoding table 4111 is a one-dimensional data table storing a plurality of decode values 4113. Each address 4112 is an addition value obtained by adding an offset 4105 to an evaluation bit pattern and is an address specifying a decode value in a line of the secondary decoding table 4111. Each decode value 4113 is a value of a decoded variable length code.

The secondary decoding table 4111 allocates each line to hold data of one code value.

(2) Outline of Entropy Decoding Process

The following is a description of the relation among the variable length code 4121 to be decoded, the primary decoding table 4101, and the secondary decoding table 4111, and of how the variable length code 4121 is subjected to the entropy decoding. Note that, in this description, the variable length code "1111 1100 1" 4121 in a code sequence is decoded.

The run length of the variable length code 4121 is "6" because each bit in the 6-bit sequence from the head bit of the variable length code 4121 is "1". The primary decoding table 4101 is searched using this run length "6" and therefore the evaluation bit pattern length "2" 4103, the maximum value "2" 4104, and the offset "20" 4105 are obtained. The start position of the evaluation bit pattern is obtained by adding a constant "1" to the run length "6." Here, the start position of the evaluation bit pattern and the evaluation bit pattern length are obtained so that the evaluation bit pattern of the variable length code 4121 is determined to be "01." The maximum value "2" 4105 is greater than the evaluation bit pattern "01" 4124 so that the evaluation bit pattern "01" 4124 is added to the offset "20" 4105. The secondary decoding table 4111 is searched using the addition value "20+01" as an address so that the decode value "91" 4113 is obtained.

If the evaluation bit pattern 4124 is greater than the maximum value 4105, the next line in the primary decoding table 4101 is searched so that the evaluation bit pattern "3," the maximum value "7" and the offset "23" are obtained. In the same manner, remaining variable length codes are subjected to the entropy decoding.

By doing so, variable length codes are decoded using the primary decoding table 4101 and the secondary decoding table 4111 to generate decode values.

3.2 Structure of Decoding Table

The following is a description of the structure of the decoding table of this embodiment and the outline of the decoding process using the decoding table.

Figure 31:
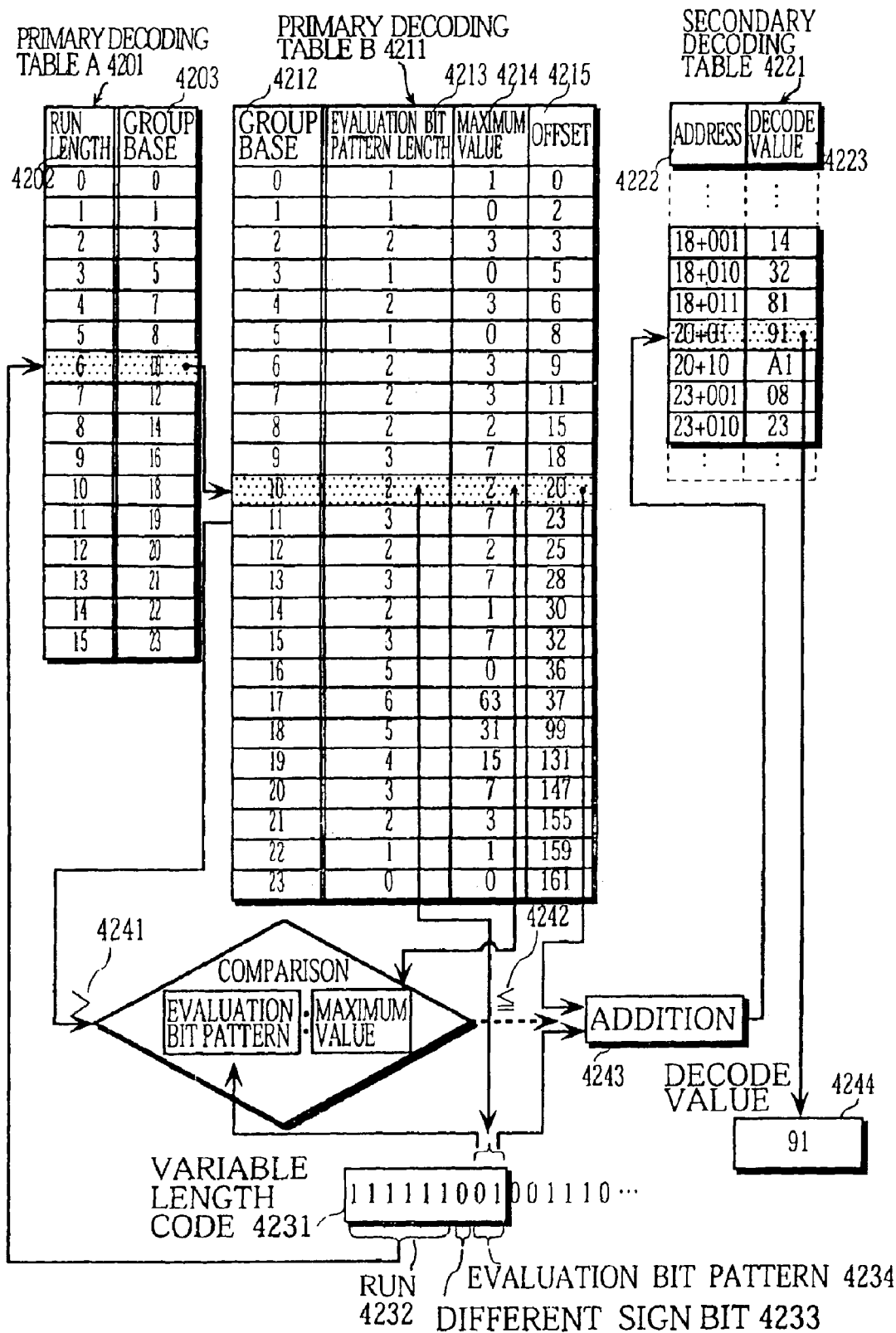
FIG. 31 shows the structure of decoding tables and the outline of the entropy decoding process of the digital still camera shown in FIG. 12 of the other embodiment.

FIG. 31 shows the decoding table and the outline of the decoding process of an embodiment of the present invention.

(1) Structure of Decoding Table

The decoding table includes the primary decoding table A4201, the primary decoding table B4211, and the secondary decoding table 4221.

It should be noted here that the number of lines allocated to each run length 4102 varies in the primary decoding table 4101 shown in FIG. 30.

Therefore, the primary decoding table 4101 is divided into the primary decoding tables A4201 and B4211.

The secondary decoding table 4221 is the same as the secondary decoding table 4111.

The primary decoding table A4201 is a one-dimensional data table storing a group base 4203.

Each run length 4202 is the same as the run length 4102 and therefore is not described here.

Each group base 4203 is a value used for the addressing in the primary decoding table B4211 and is also related to a run length 4202.

The primary decoding table A4201 allocates each line to a code group of the same run length.

The primary decoding table B4211 is a two-dimensional data table storing a plurality sets which are each composed of an evaluation bit pattern length 4213, a maximum value 4214, and an offset 4215.

Each group base 4212 is an address specifying one of the plurality of sets in a line of the primary decoding table B4211.

Each group base 4212 is related to a variable length code group of the same run length and evaluation bit pattern length, and is set in ascending order of the run length and the evaluation bit pattern length.

Each group base 4212 of the same value as a group base 4203 is related to a code group of the minimum evaluation bit pattern length in the code group related to the group base 4203.

Each evaluation bit pattern length 4213 is the same as an evaluation bit pattern length 4103, each maximum value 4214 is the same as a maximum value 4104, and each offset 4215 is the same as an offset 4105 so that the description concerning these columns are not given here.

The primary decoding table B4211 allocates each line to one code group of the same run length and code length.

The secondary decoding table 4221 is a one-dimensional data table storing a decode value 4223.

Each address 4222 is the same as the address 4112 and each decode value 4223 is the same as the decode value 4113 so that these columns are not explained here.

(2) Outline of Entropy Decoding Process

The following is a description of the relations among the variable length code 4231 to be subjected to the entropy decoding, the primary decoding table A4201, the primary decoding table B4211, and the secondary decoding table 4221, and of how the entropy decoding is performed, with reference to FIG. 31. Note that, in this description, the variable length code "1111 1100 1" 4231 is extracted from a code sequence and is decoded.

Each bit of the 6-bit sequence from the start of the variable length code 4231 is "1" so that the run length of the variable length code 4231 is "6." The primary decoding table A4201 is searched using the run length "6" as an address so that the group base "10" 4203 is obtained. The primary decoding table B4211 is searched using the group base "10" and therefore the evaluation bit pattern length "2" 4213, the maximum value "2" 4214, and the offset "20" 4215 are obtained. Because the head bit of the evaluation bit pattern 4234 is obtained by adding a constant "1" to the run length "6," the evaluation bit pattern 4234 is determined to be "01" using the head bit of the evaluation bit pattern and the evaluation bit pattern length. The maximum value "2" 4214 is greater than the evaluation bit pattern "01" 4234 so that the evaluation bit pattern "01" 4234 is added to the offset "20" 4215 and the secondary decoding table 4221 is searched using the addition value "20+01" as an address to obtain the decode value "91" 4223.

If the evaluation bit pattern 4234 is greater than the value in the maximum value 4214, the next line in the primary decoding table B4211 is searched so that the evaluation bit pattern length "3" 4213, the maximum value "7" 4214, and the offset "23" 4215 are obtained. In the same manner, remaining variable length codes are subjected to the entropy decoding.

By doing so, variable length codes are decoded using the primary decoding tables A4201 and B4211 and the secondary decoding table 4221 to generate decode values.

3.2 Successive Operation Procedure for Entropy Decoding Process

Figure 32:
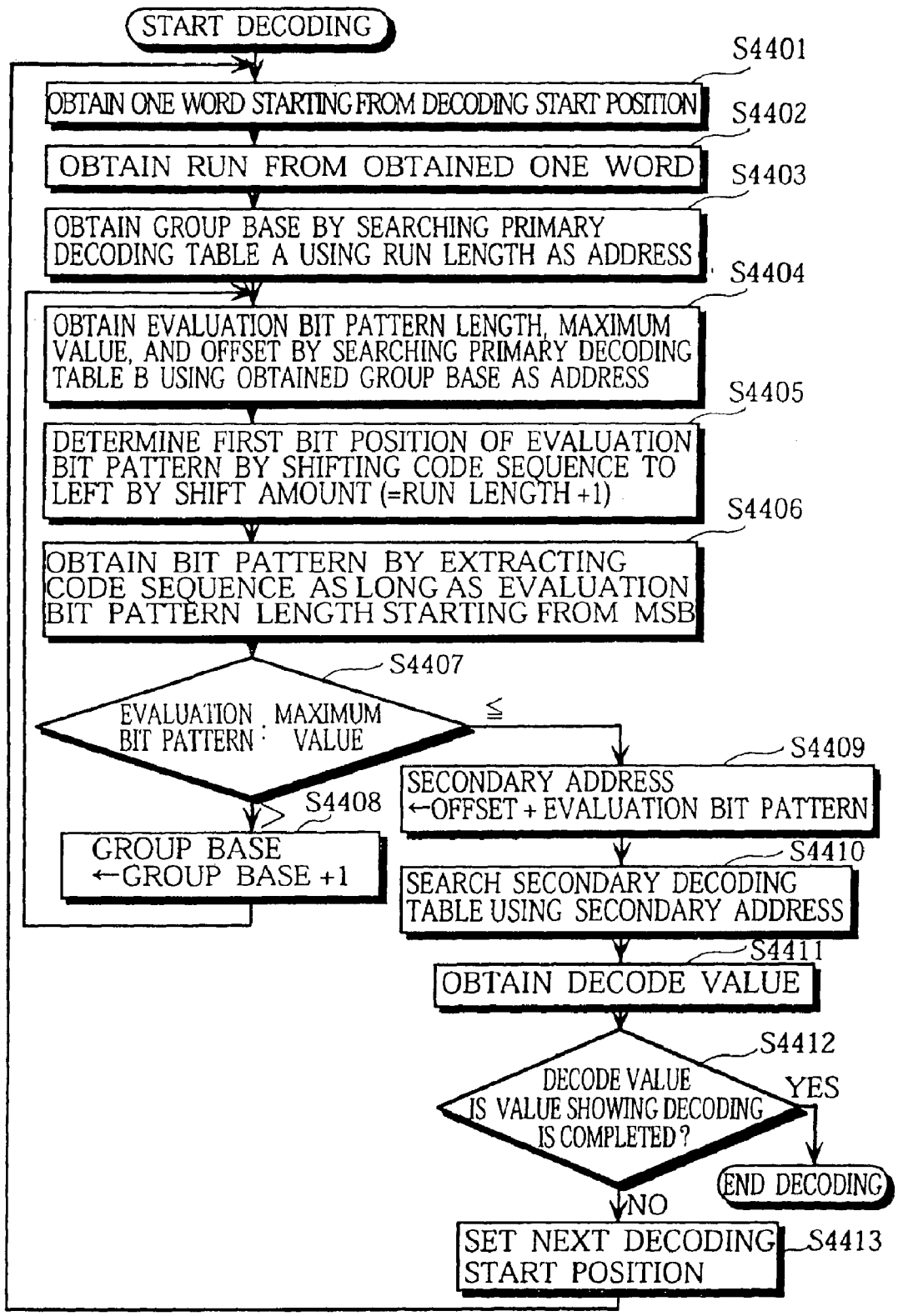
FIG. 32 is a flowchart showing the procedure for the entropy decoding process shown in FIG. 31.

The following is a description of the successive operation procedure for the entropy decoding process shown in FIG. 31, with reference to the flowchart in FIG. 32.

Note that each step below is performed by the microcomputer 1119.

A variable length code of one word is fetched from a buffer accumulating codes to be decoded so that the decode start bit is shifted to the most significant bit (Step S4401). The number of successive bits having the same sign of "0" or "1" from the most significant bit (a run length) of the fetched variable length code of one word is obtained (Step S4402). The primary decoding table A4201 is searched using the obtained run length to obtain a group base 4203 (Step S4403). The primary decoding table B4211 is searched using the obtained group base to obtain an evaluation bit pattern 4213, a maximum value 4214, and an offset 4215 (Step S4404). The run length is added to a constant "1" to obtain a shift amount. The variable length code is shifted to the left by the obtained shift amount to determine the head bit of the evaluation bit pattern (Step S4405) and is shifted to the right by the obtained evaluation bit pattern length to determine the last bit of the evaluation bit pattern (Step S4406). As a result, the evaluation bit pattern is obtained. When the evaluation bit pattern is greater than a maximum value 4214 (Step S4407), the obtained group base 4203 is added to a constant "1" (Step S4408) and the operation returns to Step S4404 to repeat this process. When the evaluation bit pattern is smaller than or equal to a maximum value 4214 (Step S4407), the obtained offset 4215 is added to the evaluation bit pattern to calculate an address in the secondary decoding table (Step S4409). The secondary decoding table 4221 is searched using the calculated address (Step S4410) and a decode value 4223 is obtained (Step S4411). Whether the obtained decode value 4223 is a value indicating the end of the decoding is judged. If the obtained decode value 4223 is judged to be the value indicating the end of the decoding (Step S4412), this decoding process is completed; if not (Step S4412), the next start position of the code sequence is calculated using start bit=run length+constant "1"+evaluation bit pattern length, the next start position is shifted to the most significant bit (Step S4413), and the operation returns to Step S4401 to repeat the decoding process.

3.3 Conclusion

With the method disclosed in Japanese Laid-Open Patent Application No. 6-44039, when the bit width of the shift amount column is 4 bits, the bit width of the evaluation bit pattern length is 4 bits, the bit width of the offset is 4 bits, and there are 16 types of run lengths, the size of the primary decoding table for DC coefficients is 192 bits calculated from (8 bits+4 bits)×16 types. When the bit width of the decode value column is 8 bit, the bit width of the code length column is 4 bit, and there are 16 types of addresses, the size of the secondary decoding table for DC coefficients is 192 bits calculated from (8 bits+4 bits)×16 types. When the bit width of the shift amount column is 4 bits, the bit width of the evaluation bit pattern length column is 4 bits, the bit width of the offset column is 4 bits, and there are 16 types of run lengths, the size of the primary decoding table for AC coefficients is 192 bits calculated from (8 bits+4 bits)×16 types. When the bit width of the decode value column is 8 bit, the bit width of the code length column is 4 bit, and there are 256 types of addresses, the size of the secondary decoding table for AC coefficients is 3072 bits calculated from (8 bits+4 bits)×256 types.

Because two pairs of a DC coefficient decoding table and an AC coefficient decoding table are usually used in JPEG, the total size of all decoding tables is 7296 bits calculated from (192 bits+192 bits)×2+(192 bits+3072 bits)×2.

With the present invention, when the bit width of the group base column is 4 bits and there are 16 types of the run lengths, the primary decoding table A for DC coefficients is 64 bits calculated from 4 bits×16 types. When the bit width of the evaluation bit pattern length column is 4 bits, the bit width of the maximum value column is 8 bits, the bit width of the offset column is 8 bits, and there are 16 types of the group bases, the size of the primary decoding table B for DC coefficients is 320 bits calculated from (4 bits+8 bits+8 bits)×16 types. When the bit width of the decode value column is 8 bits and there are 16 types of addresses, the size of the secondary decoding table for DC coefficients is 128 bits calculated from 8 bits×16 types.

When the bit width of the group base is 5 bits and there are 16 types of run lengths, the size of the primary decoding table A for AC coefficients is 80 bits calculated from 5 bits×16 bits. When the bit width of the evaluation bit pattern length column is 4 bits, the bit width of the maximum value column is 8 bits, the bit width of the offset column is 8 bits, and there are 32 types of group bases, the size of the primary decoding table B is 640 bits calculated from (4 bits+8 bits+8 bits)×32 types. When the bit width of the decode value column is 8 bit and there are 256 types of addresses, the size of the secondary decoding table for AC coefficients is 2048 bits calculated from 8 bits×256 types.

Because two pairs of a DC coefficient decoding table and an AC coefficient decoding table are usually used in JPEG, the total size of all decoding tables is 6560 bits calculated from (64 bits+320 bits+128 bits)×2+(80 bits+640 bits+2048 bits)×2.

As described above, with the present invention, the total size of decoding tables can be reduced, compared with the conventional technique disclosed in Japanese Laid-Open Patent Application No. 6-44039.

A compression code sequence of JPEG includes a Huffman table defined beforehand and the structure of the Huffman table is the same as that of the secondary decoding table. Therefore, a secondary decoding table is not necessary to be made up and to be stored in an image decoding apparatus if the image decoding apparatus stores entire JPEG image data in its memory.

In this case, each size of primary decoding tables A and B for DC coefficients is 384 bits and each size of primary decoding tables A and B for AC coeffinients is 720 bits. Two pairs of a DC coefficient decoding table and an AC coefficient decoding table are usually used for JPEG so that the total size of decoding tables is 2208 bits calculated from 384 bits×2+720 bits×2.

It should be noted here that the present invention is not limited to the above embodiment and the following modifications are included in the present invention.

(1) While variable length codes are decoded in this embodiment, fixed length codes may be decoded.

(2) While the variable length code of the above embodiment has the run of sequent bits "1" from the start, the method of this embodiment may be applied to a case where a variable length code has a run of sequent bits "0" from the start.

In this case, the primary decoding table shown in FIG. 30 may be a two-dimensional data table composed of such columns as a run length, an evaluation bit pattern length, a minimum value, and an offset. Here, the run length, the evaluation bit pattern length, and the offset are the same as the run length 4102, the evaluation bit pattern length 4103, and the offset 4105 in the primary decoding table, respectively.

A run is a bit sequence having the same sign from the start in a variable length code and the run of this modification is a bit sequence of the sign "0."

The minimum value is a minimum value among a group of evaluation bit patterns of variable length codes of the same run length and the same code length.

Also, in this case, the primary decoding table B shown in FIG. 31 may be a two-dimensional data table storing a plurality of sets which are each composed of an evaluation bit pattern length, a minimum value, and an offset. A group base is an address specifying one of the plurality of sets in a line of the table. Here, the group base, the evaluation bit pattern length, and the offset are the same as the group base 4212, the evaluation bit pattern length 4213, and the offset 4215 in the primary decoding table B4211, respectively. Also, the minimum value is the same as that described above.

The description of the successive operation procedure for the decoding process after Step S4407 in the flowchart in FIG. 32 is provided below.

Note that each step below is performed by the microcomputer 1119.

The evaluation bit pattern is compared with the minimum value. If the evaluation bit pattern is smaller than the minimum value, the group base 4203 is added to a constant "1" (Step S4408) and the operation returns to Step S4404 to repeat the process.

If the evaluation bit pattern is greater than or equal to the minimum value, the control proceeds to Step S4409 to perform remaining steps.

(3) While one decode value is obtained from one code in Embodiment 3, a decode value composed of a zero run length and a non-zero coefficient value may be obtained from one code. In this case, a zero run length and a non-zero coefficient value may be generated as a decode value by, as described in Embodiment 1, relating a code to a decode value composed of a zero run length and a non-zero coefficient value and by subjecting the code to an entropy decoding. As described above, one decode value may be composed of two or more types of information.

(4) A specific entropy decoding process of the digital still camera of Embodiment 1 has been described in Embodiment 3, although this embodiment may be applied to steps S1961 and S1964 in the flowchart of the entropy decoding process of the expansion decoding process of a conventional image decoding apparatus shown in FIG. 5. Also, this embodiment is not restricted to the decoding of image data and may be applied to the decoding of other information.

(5) Another embodiment may be a recording medium which can be read by a computer and includes a decoding program for the above decoding method executed by the computer. Still, the decoding program may be transmitted via a telecommunication line.

4. Embodiment 4

The following description concerns an embodiment of a specific operation of the entropy coding process of the digital still camera shown in FIG. 12, namely Steps S1114 and S1121 in the flowchart shown in FIG. 14. The structure of the coding table, the operation of the entropy coding process, and an example of the coding table are explained with reference to the drawings.

4.1 Principle of Entropy Coding

The following is a description of the principle of the entropy coding of the present embodiment.

Figure 33:
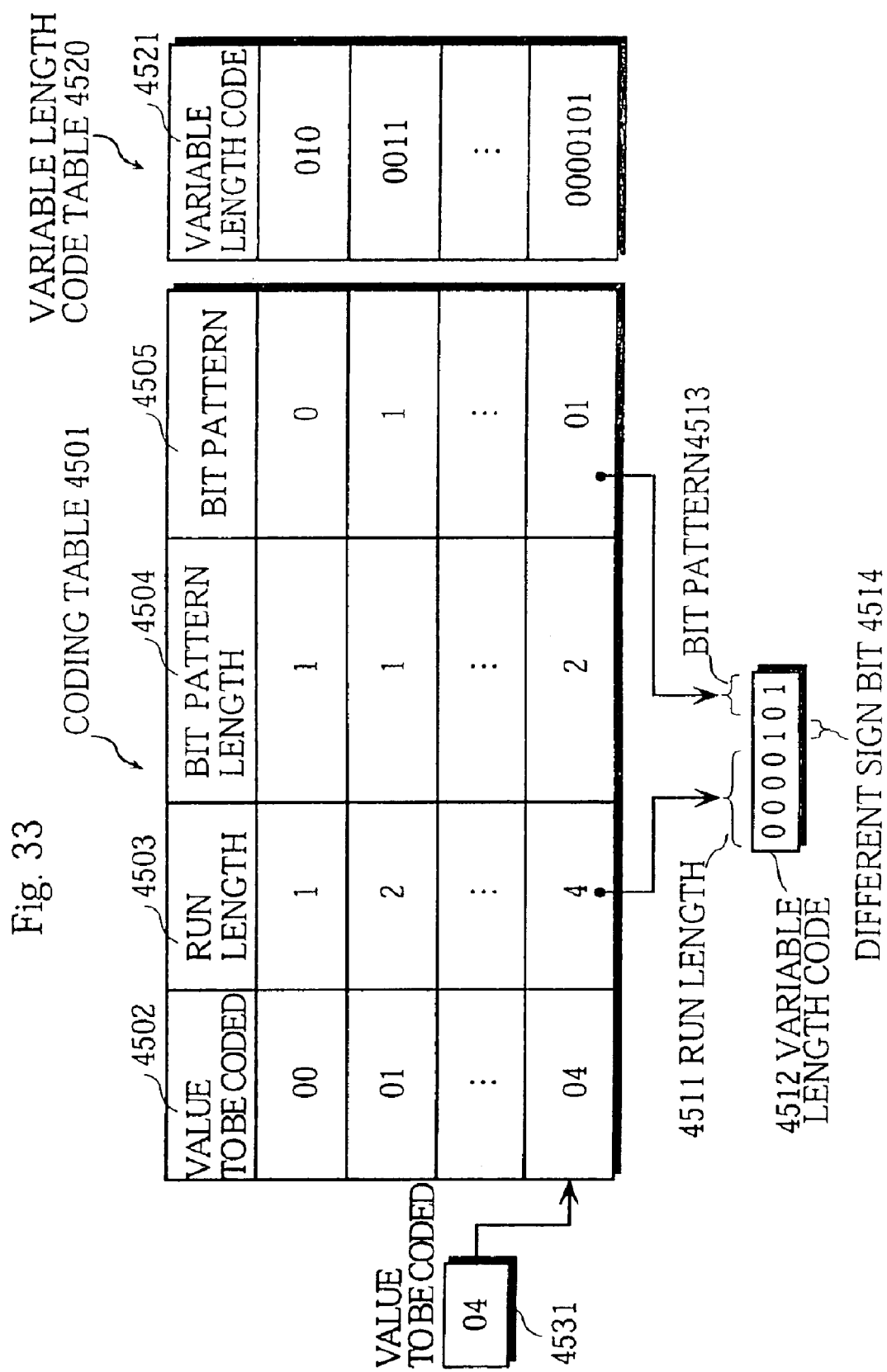
FIG. 33 shows the structure of coding tables and the outline of the entropy coding process of the digital still camera shown in FIG. 12 of the other embodiment.

FIG. 33 shows the coding table and the principle of the entropy coding of the present invention.

(1) Structure of Coding Table

As shown in FIG. 33, the coding table 4501 is a two-dimensional data table storing a plurality of sets which are each composed of a run length 4503, a bit pattern length 4504, and a bit pattern 4505.

Each value to be coded 4502 is a value to be subjected to the entropy coding and is also used as an address specifying one of the plurality of sets in a line of the coding table 4501.

Each run length 4503 is a bit length of a run, that is, a bit sequence of the same sign of "0" or "1" from the start of a variable length code obtained by coding each value to be coded 4502.

Each bit pattern length 4504 is a length of a bit sequence following the different sign bit of 1 bit which follows the run of a variable length code obtained by subjecting a value to be coded 4502 to the entropy coding.

Each bit pattern 4505 is a bit sequence following the different sign bit of 1 bit which follows the run of a variable length code obtained by subjecting a value to be coded 4502 to the entropy coding.

The variable length code table 4520 shown in FIG. 33 shows an example of variable length codes obtained after the entropy coding. Each line in the variable length code table 4520 corresponds to one line in the coding table 4501.

(2) Outline of Entropy Coding Process

The following is a description of the relations among the value to be coded 4531 to be subjected to the entropy coding, the coding table 4501, and the variable length code 4512 obtained by subjecting a value to be coded 4531 to the entropy coding, and of how the variable length code 4512 is generated. In this description, the value to be coded "04" 4531 is subjected to the entropy coding to generate the variable length code "0000 101" 4512.

The coding table 4501 is searched using the value to be coded "04" 4531 and the run length "4" 4503, the bit pattern length "2" 4504, and the bit pattern "01" 4505 are obtained.

Because the run length 4503 is "4," four sequent bits "0," that is, a bit sequence "0000" is generated.

The different sign bit "1" is generated following this bit sequence.

The generated bit sequence "0000" and different sign bit "1" and the obtained bit pattern "01" 4505 are combined to generate the variable length code "0000101" 4512.

4.2 Successive Operation Procedure for Entropy Coding Process

Figure 34:
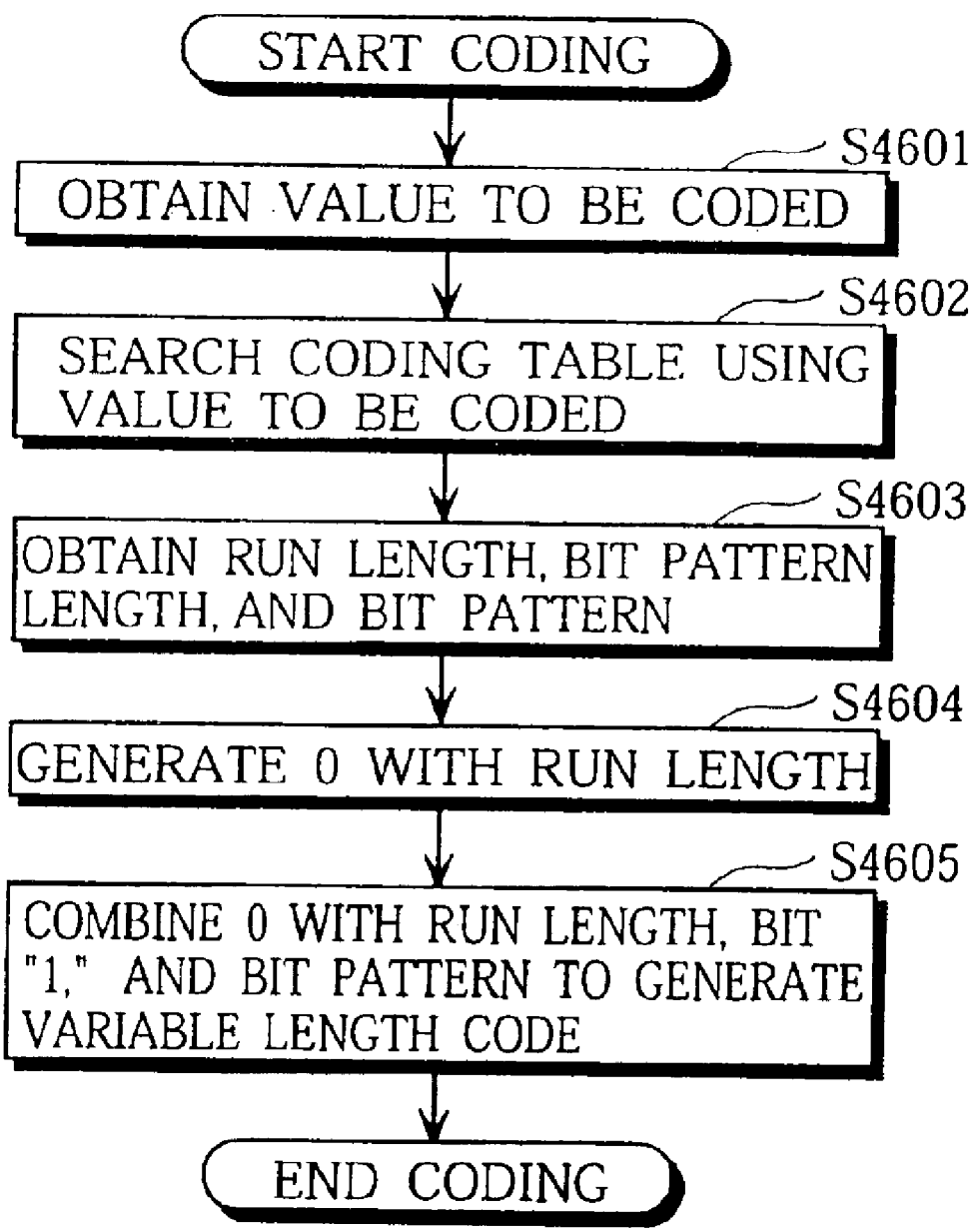
FIG. 34 is a flowchart showing the procedure for the entropy coding process shown in FIG. 33.

The following is a description of the successive operation procedure for the entropy coding process shown in FIG. 33, with reference to the flowchart shown in FIG. 34.

Note that each step below is performed by the microcomputer 1119.

A value to be coded is fetched from a buffer accumulating values to be subjected to the entropy coding (Step S4601). The coding table is searched for the fetched value to be coded (Step S4602) to obtain its corresponding run length, bit pattern length, and bit pattern (Step S4603). A bit sequence of bits "0" or "1" is generated using the obtained run length (Step S4604). The generated bit sequence of bits "0" or "1," a different sign bit, and the obtained bit pattern are combined to generate its corresponding variable length code (Step S4605).

4.3 Conclusion

FIG. 35 shows a conventional coding table. The coding table 4540 shown in FIG. 35 stores pairs of a bit pattern length 4542 giving a bit length of a variable length code obtained after the entropy coding and a bit pattern 4543 giving a bit pattern of a variable length code obtained after the entropy coding. Each value to be coded 4541 is an address specifying one of the pairs in a line of the coding table 4540. Conventionally, the coding table 4540 is searched using a value to be subjected to the entropy coding to obtain a corresponding bit pattern length 4542 and a corresponding bit pattern 4543. A variable length code corresponding to the value to be subjected to the entropy coding is generated using the obtained bit pattern length 4542 and bit pattern 4543.

With this conventional method, when the bit width of the bit pattern length column is 5 bits, the bit width of the bit pattern column is 16 bits, and the number of lines is 16, the size of a coding table for DC coefficients is 336 bits calculated from (5 bits+16 bits)×16 lines. When the bit width of the bit pattern length column is 5 bits, the bit width of the bit pattern column is 16 bits, and the number of lines is 256, the size of the coding table for AC coefficients is 5376 calculated from (5 bits+16 bits)×256 lines.

Two pairs of a DC coefficient coding table and an AC coefficient coding table are usually used for JPEG so that the total size of coding tables is 11424 bits calculated from 336 bits×2+5376 bits×2.

FIG. 36 shows a coding table of the present invention.

With the method of the present invention, when the bit width of the run length column is 4 bits, the bit width of the bit pattern length column is 4 bits, the bit width of the bit pattern column is 8 bits, and the number of lines is 16, the size of a coding table for DC coefficients is 256 bits calculated from (4 bits+4 bits+8 bits)×16 lines. When the bit width of the run length column is 4 bits, the bit width of the bit pattern length column is 4 bits, the bit width of the bit pattern column is 8 bits, and the number of lines is 256, the size of the coding table for AC coefficients is 4096 bits calculated from (4 bits+4 bits+8 bits)×256 lines.

Two pairs of a DC coefficient coding table and an AC coefficient coding table are usually used for JPEG so that the total size of coding tables is 8704 bits calculated from 256 bits×2+4096 bits×2.

As described above, with the present invention, the total size of coding tables can be reduced, compared with the conventional technique.

It should be noted here that the present invention is not limited to the above embodiment and the following modifications are included in the present invention.

(1) While variable length codes are generated by the entropy coding in this embodiment, fixed length codes may be generated.

(2) While one code is obtained from one value to be coded in Embodiment 4, one code is obtained from a value composed of a zero run coefficient and a non-zero coefficient. As described above, a value to be coded may be composed of two or more types of information.

Figure 3:
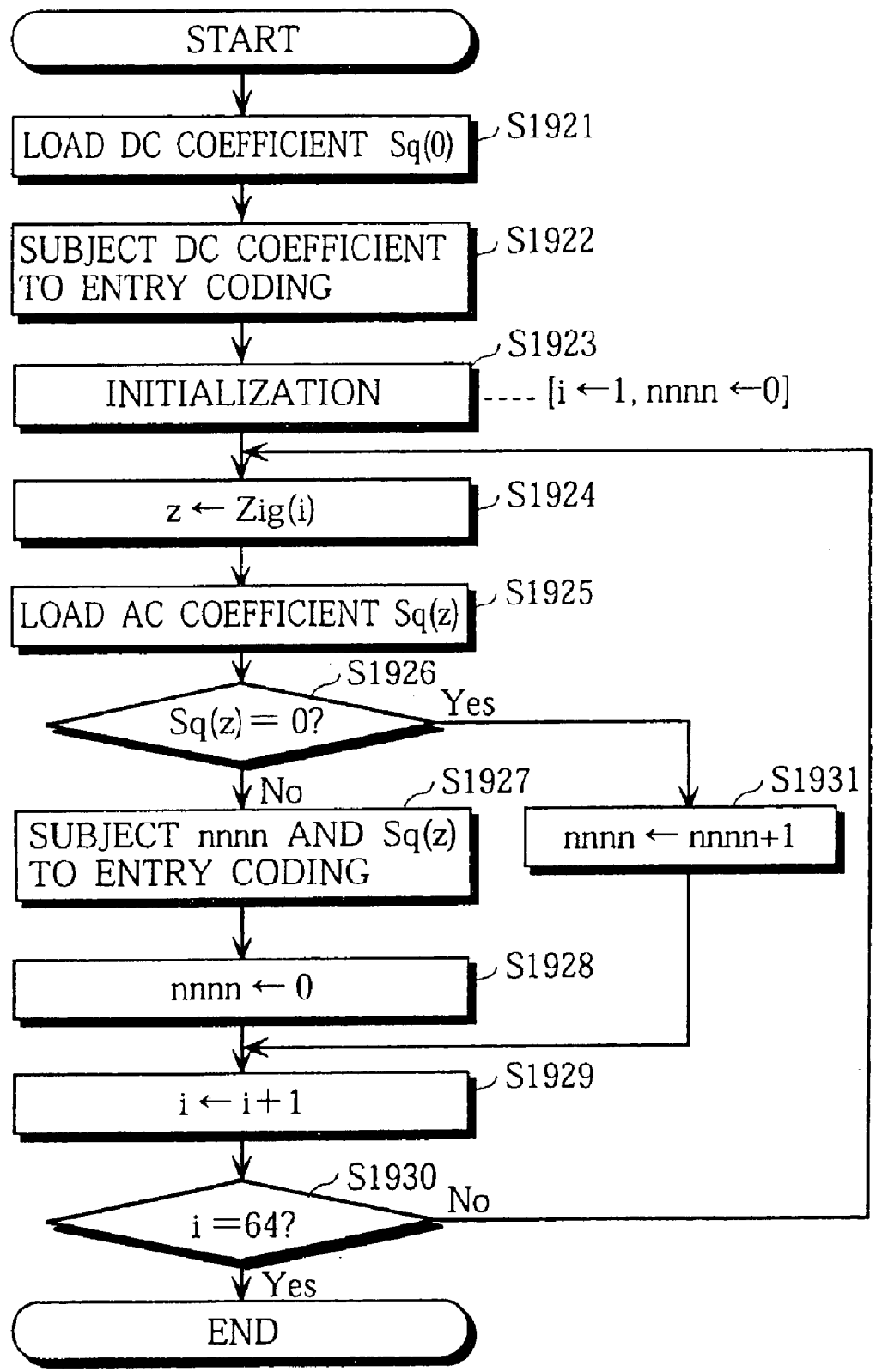
FIG. 3 is a flowchart showing the entropy coding step in the coding procedure of the conventional image coding apparatus.

(3) A specific entropy coding process of the digital still camera of Embodiment 1 has been described in Embodiment 4, although this embodiment may be applied to steps S1922 and S1927 in the flowchart of the entropy coding process of the compression coding process of a conventional image coding apparatus shown in FIG. 3. Also, this embodiment is not restricted to the coding of image data and may be applied to the coding of other information.

(4) Another embodiment may be a recording medium which can be read by a computer and includes a coding program for the above coding method executed by the computer. Also, the coding program may be transmitted via a telecommunication line.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image decoding apparatus for restoring image data by decoding an entropy code to generate a coefficient relating to the image data, the entropy code being a bit pattern of which bit length is variable depending on occurrence probability of the coefficient, the image decoding apparatus comprising:

a code string storing unit operable to store a code string including an entropy code, the entropy code being generated by coding a coefficient relating to image data;

a decoding table containing a coefficient corresponding to an entropy code;

a code specifying table containing entry information showing an entropy code corresponding to a coefficient, the entry information including compressed information and uncompressed information, the compressed information being generated by run-length compressing a part of the entropy code and showing a bit length of the run-length compressed part, and the uncompressed information showing another part of the entropy code aside from the run-length compressed part;

a run-length obtaining unit operable to obtain a run-length of a run included in the code string, the run being a bit string of consecutive, same sign bits starting from a predetermined bit location;

a bit length obtaining unit operable to obtain from the code specifying table uncompressed information corresponding to compressed information showing a same bit length as the obtained run-length;

a specifying unit operable to specify, as the entropy code, a bit string that starts from the predetermined bit location and that has a length determined based on the obtained run-length and the length shown by the obtained uncompressed information; and a decoding unit operable to obtain from the decoding table a coefficient corresponding to the specified entropy code.

2. The image decoding apparatus of claim 1, wherein the entropy code is a Huffman code.

3. The image decoding apparatus of claim 1, wherein the uncompressed information shows a bit length of an evaluation part of the entropy code, the evaluation part being said another part aside from a highest order bit, the bit length obtaining unit obtains the bit length of the evaluation part as the uncompressed information corresponding to the compressed information that shows the same bit length as the obtained run-length, and the specifying unit specifies, as the entropy code, the bit string having the bit length determined by a sum of the obtained run-length, a constant "1", and the bit length of the evaluation part.

4. The image decoding apparatus of claim 3, wherein the code specifying table further contains a limit value corresponding to the compressed information, the limit value indicating a range of the bit string being the evaluation part shown by the uncompressed information, the bit length obtaining unit further obtains from the code specifying table the limit value corresponding to the compressed information showing the same bit length as the obtained run-length, and the specifying unit further (a) obtains an acquisition bit string that starts from a position shifted from the predetermined bit location by a sum of the run-length and the constant "1" and that has a same bit length as the evaluation part, (b) compares the obtained limit value with the obtained acquisition bit string to judge, when the acquisition bit string is within the range indicated by the limit value, that the entropy code is specified, and (c) specifies as the entropy code, when judging that the entropy code is specified, a bit string that starts from the predetermined bit location and that has a bit length determined by a sum of the run-length, the constant "1", and the bit length of the evaluation part.

5. The image decoding apparatus of claim 4, wherein the decoding table contains the coefficient at a memory location indicated by a second address, the second address corresponding to the entropy code, the code specifying tale contains a first data set at a memory location indicated by a first address corresponding to the compressed information, the first data set containing the uncompressed information, the limit value, and a first offset address that relates to an address indicating the memory location where the coefficient is stored, the bit length obtaining unit obtains from the code specifying table the first data set contained at the memory location indicated by the first address, the first address being the run-length obtained by the run-length obtaining unit, the specifying unit (a) obtains the acquisition bit string that has a same bit length as the bit length shown by the uncompressed information contained in the first data set, (b) compares the limit value with the acquisition bit string to judge, when the acquisition bit string is within the range indicated by the limit value, that the decoding table is to be searched, and (c) calculates, when judging that the decoding table is to be searched, a value by adding the offset address included in the first data set and the acquisition bit string, and the decoding unit obtains, when the specifying unit judges that the decoding table is to be searched, a coefficient stored at a memory location indicated by a second address, the second address being the calculated value.

6. The image decoding apparatus of claim 5, wherein the code specifying table further contains a second data set at a memory location indicated by the first address, the second data set including a second bit length that is different from the bit length shown by the uncompressed information, a second limit value indicating a range of a different bit string, and a second offset value regarding a different address indicating a memory location where in the decoding table the coefficient is contained, the specifying unit, when the acquisition bit string is not within the range indicated by the limit value, further (a) judges that the code specifying table is to be searched, (b) obtains from the code specifying table the second data set contained at the location indicated by the first address, the first address being the run-length, (c) obtains a second bit string that starts from a position shifted from the predetermined bit location by a sum of the run-length and the constant "1" and that has a same bit length as the second bit length included in the second data set, and (d) compares the second limit value with the second bit string to judge, when the second bit string is within the range indicated by the second limit value, that the decoding table is to be searched, and the decoding unit further obtains, when the specifying unit judges that the decoding table is to be searched, from the decoding table a coefficient stored at a memory location indicated by the second address, the second address being a sum of the second offset address contained in the second data set and the second bit string.

7. A digital still camera for decoding a code string, the code string including a plurality of entropy codes, the entropy codes being generated by orthogonally transforming, quantizing and entropy coding each pixel of a block, the block including a predetermined number of pixels and being obtained by dividing image data, the digital still camera comprising:

a first storage unit operable to store the code string;

an entropy decoding unit operable to extract an entropy code from the first storage unit, entropy decoding the extracted entropy code to generate a coefficient corresponding to the entropy code;

a coefficient generation unit operable to generate an orthogonal transform coefficient based on the generated coefficient;

a second storage unit operable to store the generated orthogonal transform coefficient;

a decoding control unit operable to direct, after the generated coefficient has been processed by the coefficient generation unit and the second storage unit, the entropy decoding unit to extract a next entropy code and perform entropy decoding for the newly extracted entropy code;

an inverse orthogonal transformation unit operable to read the orthogonal transform coefficient from the second storage unit, and convert the orthogonal transform coefficient to generate a plurality of blocks; and a display unit operable to generate image data from the newly generated blocks, and display the newly generated image data, wherein the entropy decoding unit includes:

a code string storing subunit operable to store a code string including an entropy code, the entropy code being generated by coding a coefficient relating to the image data;

a decoding table containing a coefficient corresponding to an entropy code;

a code specifying table containing entry information showing an entropy code corresponding to a coefficient, the entry information including compressed information and uncompressed information, the compressed information being generated by run-length compressing a part of the entropy code and showing a bit length of the run-length compressed part, and the uncompressed information showing another part of the entropy code aside from the run-length compressed part;

a run-length obtaining subunit operable to obtain a run-length of a run included in the code string, the run being a bit string of consecutive, same sign bits starting from a predetermined bit location;

a bit length obtaining subunit operable to obtain from the code specifying table the uncompressed information corresponding to the compressed information showing a same bit length as the obtained run-length;

a specifying subunit operable to specify, as the entropy code, a bit string that starts from the predetermined bit location and that has a length determined based on the obtained run-length and the length shown by the obtained uncompressed information; and a decoding subunit operable to obtain from the decoding table a coefficient corresponding to the specified entropy code.

8. An image decoding method for use by an image decoding apparatus that performs restoring of image data by decoding an entropy code to generate a coefficient relating to the image data, the entropy code being a bit pattern of which bit length is variable depending on occurrence probability of the coefficient, the image decoding apparatus including: a code string storing unit operable to store a code string including an entropy code, the entropy code being generated by coding a coefficient relating to the image data; a decoding table containing a coefficient corresponding to an entropy code; and a code specifying table containing entry information showing an entropy code corresponding to a coefficient, the entry information including compressed information and uncompressed information, the compressed information being generated by run-length compressing a part of the entropy code and showing a bit length of the run-length compressed part, and the uncompressed information showing another part of the entropy code aside from the run-length compressed part, the image decoding method comprising:

a run-length obtaining step of obtaining a run-length of a run included in the code string, the run being a bit string of consecutive, same sign bits starting from a predetermined bit location;

a bit length obtaining step of obtaining from the code specifying table uncompressed information corresponding to compressed information showing a same bit length as the obtained run-length;

a specifying step of specifying, as the entropy code, a bit string that starts from the predetermined bit location and that has a length determined based on the obtained run-length and the length shown by the obtained uncompressed information; and a decoding step of obtaining from the decoding table a coefficient corresponding to the specified entropy code.

9. An image decoding program for execution by a computer and for use by an image decoding apparatus that performs restoring of image data by decoding an entropy code to generate a coefficient relating to the image data, the entropy code being a bit pattern of which bit length is variable depending on occurrence probability of the coefficient, the image decoding apparatus including: a code string storing unit operable to store a code string including an entropy code, the entropy code being generated by coding a coefficient relating to the image data; a decoding table containing a coefficient corresponding to an entropy code; and a code specifying table containing entry information showing an entropy code corresponding to a coefficient, the entry information including compressed information and uncompressed information, the compressed information being generated by run-length compressing a part of the entropy code and showing a bit length of the run-length compressed part, and the uncompressed information showing another part of the entropy code aside from the run-length compressed part, the image decoding program comprising:

program code operable to cause the computer to obtain a run-length of a run included in the code string, the run being a bit string of consecutive, same sign bits starting from a predetermined bit location;

program code operable to cause the computer to obtain from the code specifying table uncompressed information corresponding to compressed information showing a same bit length as the obtained run-length;

program code operable to cause the computer to specify as the entropy code, a bit string that starts from the predetermined bit location and that has a length determined based on the obtained run-length and the length shown by the obtained uncompressed information; and program code operable to cause the computer to obtain from the decoding table a coefficient corresponding to the specified entropy code.

10. A computer-readable medium storing an image decoding program for use by an image decoding apparatus that performs restoring of image data by decoding an entropy code to generate a coefficient relating to the image data, the entropy code being a bit pattern of which bit length is variable depending on occurrence probability of the coefficient, the image decoding apparatus including: a code string storing unit operable to store a code string including an entropy code, the entropy code being generated by coding a coefficient relating to the image data; a decoding table containing a coefficient corresponding to an entropy code; and a code specifying table containing entry information showing an entropy code corresponding to a coefficient, the entry information including compressed information and uncompressed information, the compressed information being generated by run-length compressing a part of the entropy code and showing a bit length of the run-length compressed part, and the uncompressed information showing another part of the entropy code aside from the run-length compressed part, the image decoding program comprising:

a run-length obtaining step of obtaining a run-length of a run included in the code string, the run being a bit string of consecutive, same sign bits starting from a predetermined bit location;

a bit length obtaining step of obtaining from the code specifying table uncompressed information corresponding to compressed information showing a same bit length as the obtained run-length;

a specifying step of specifying, as the entropy code, a bit string that starts from the predetermined bit location and that has a length determined based on the obtained run-length and the length shown by the obtained uncompressed information; and a decoding step of obtaining from the decoding table a coefficient corresponding to the specified entropy code.

* * * * *